April 15, 1969          W. B. INNES          3,438,721
OXIDATION CATALYST FOR HYDROCARBON COMBUSTION EXHAUST
GASES AND PROCESS FOR USING THE SAME
Original Filed Dec. 10, 1964

INVENTOR.
WILLIAM BEVERIDGE INNES

BY

ATTORNEY

United States Patent Office 3,438,721
Patented Apr. 15, 1969

3,438,721
OXIDATION CATALYST FOR HYDROCARBON COMBUSTION EXHAUST GASES AND PROCESS FOR USING THE SAME
William Beveridge Innes, Upland, Calif., assignor to American Cyanamid Company, Stamford, Conn., a corporation of Maine
Original application Dec. 10, 1964, Ser. No. 417,405. Divided and this application Feb. 24, 1966, Ser. No. 529,866
Int. Cl. B01d 53/34; B01j 9/04, 11/44
U.S. Cl. 23—2          7 Claims

ABSTRACT OF THE DISCLOSURE

A method for oxidizing combustion exhaust gases by contacting in the presence of oxygen with an alumina base catalyst having copper and vanadium and optionally palladium; and an automobile exhaust gas converter using such a catalyst.

---

Figure 2:
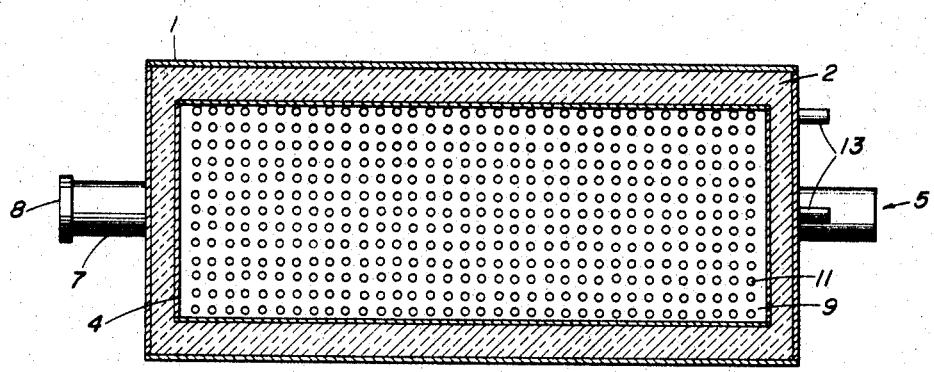

This application is a division of application Ser. No. 417,405, filed Dec. 10, 1964, now Patent No. 3,282,861.

The present invention relates to novel oxidation catalysts for hydrocarbon combustion exhaust gases and to the process of using the same to oxidize hydrocarbon combustion exhaust gases whereby the smog-forming potential of such gases is minimized as in the health hazard resulting from the presence of such gases in the atmosphere.

"Smog," as the term is generally employed, is broadly understood to refer to a variety of phenomena which are related to the interaction of nitrogen oxides, hydrocarbons and sunlight. These include a foglike haze, high oxidant concentration in the atmosphere (mostly ozone), eye irritation, plant damage and the like. In general, smog is defined more fully in an article by W. L. Faith entitled, "Nature of Smog," in Chemical Engineering Progress 53, 406 (1957).

Evaporation of gasoline and solvents alone account for a mixture of hundreds of different organic compounds while the incomplete combustion of gasoline and other organic materials add further to this complexity. Atmospheric reaction of these pollutants with the natural components of the air, oxygen and water aided by sunlight, cause drastic changes in the compositions of the original emissions, with the formation of a new set of pollutants. The increase in size and density of population in our present-day metropolitan areas was bound to lead to excessive and objectionable levels of concentration of these secondary products.

Metropolitan areas where natural ventilation is limited through frequent inversion conditions and low wind speeds, and stagnant weather conditions which are experiencing smog symptoms, through not as frequent and intense as Los Angeles, include San Francisco Bay area, Imperial Valley and New York City, for example. The symptoms are a particular type of plant damage referred to as oxidant and ozone type, eye irritation, high oxidizing power of the air, mainly caused by abnormal high concentration of ozone, and decrease in visibility.

A recent survey showed that the daily emissions in the Los Angeles area amount to 2500 tons of organics, 8000 tons of carbon monoxide, and 700 tons of oxides of nitrogen. The 3,250,000 gasoline-powered motor vehicles are responsible for 70% of the organics and 50% oxides of nitrogen and practically 100% of the carbon monoxide emissions.

The formation of excessive and objectionable levels of hydrocarbon oxidation products is attributed to the oxidation of petroleum products in the presence of oxides of nitrogen. To accomplish this oxidation sunlight is needed. When plants are fumigated in the dark with various olefins and oxides of nitrogen at concentrations of about 1 p.p.m., no damage is observed. However, when the same experiment is done in sunlight, typical damage patterns result, identical with those observed during smog attacks. Parallel with the formation of the phytotoxicants, eye irritation is experienced.

Exhaust gases from internal combustion engines and, in particular, from automobile gasoline internal combustion engines, have been demonstrated to be a primary cause of "photochemical smog" in heavily populated metropolitan centers of this country, such as Los Angeles, Calif. Particularly, olefin components of such gases have been demonstrated to be principal causes of "photochemical smog."

Investigations of the smog mechanism have been carried out mainly with oxides of nitrogen and pure hydrocarbons, and there is general agreement that the primary process in smog reactions is a photodissociation of nitrogen dioxide with the formation of nitric oxide and atomic oxygen.

With respect to smog formation, the most reactive organic compounds are olefins and diolefins. However, some of the less reactive species, such as oxygen derivatives, for example aldehydes, aromatic compounds, and saturated hydrocarbons, contribute (1) to the production of ozone and (2) to irritants.

Peroxy peracyl nitrates are of special interest because of their plant damaging properties as well as their contribution to eye irritation. Their formation is strong evidence of the correctness of the proposed theory that peroxyl free radicals are formed in the smog reactions. The presence of olefins plays an important role in the formation of eye irritants, phytotoxicants and haze and there is no reasonable doubt that reduction of olefins and other reactive organic pollutants is the most practical way for returning air of acceptable quality to our cities.

Results of several recent laboratory invesigations of the physiological effects of brief exposures of experimental animals to irradiated (1) air:exhaust mixtures and (2) their constituents where each was employed separately, by Sheldon D. Murphy, Ph.D, Asst. Professor of Toxicology, Department of Physiology, Harvard School of Public Health, Boston, Mass. demonstrate that photochemical reaction products formed during irradiation of exhaust mixtures enhance the physiological activity of the mixtures. Also the qualitative nature of response to exhaust pollution is dependent not only upon absolute concentrations of the total constituents in the mixture, but upon the relative concentrations of constituents as well. The several series of experiments demonstrated that respiratory function and activity patterns of experimental animals are altered during brief exposure to irradiated air:auto exhaust mixtures at concentrations of total exhaust that were only 2 to 3 times those that occur in certain urban communities during maximum periods of photochemical air pollution. One clinical study demonstrated that symptoms and well being of a group of emphysema patients were improved when they were placed in wards that were ventilated with charcoal-filtered air, instead of ambient air that was heavily polluted with auto exhaust and its photochemical reaction products (H. L. Montley and G. I. Leftwich, "Effect of Polluted Los Angeles Air (Smog) on Lung Volume Measurements," J.A.M.A., 171, 1469 (1959)).

In a study by Walter W. Heck, acetylene, ethylene and propylene were found to be toxic to plants at various concentrations. These olefin gases were studies in combination with each other and with nitrogen dioxide in the dark and under irradiated conditions to determine injury in cotton, pinto bean or endive. It was found that irradiated mixtures of propylene and nitrogen dioxide caused typical oxidant injury. Except with cotton, injury always occurred when plants were fumigated in the light, and previous periods of dark affected the intensity of the injury symptoms.

Dr. Burney, U.S. Surgeon General, called attention to the strong correlation of lung cancer with air pollution (L. E. Burney, Proc. National Conference on Air Pollution, Washington, D.C., November 1958).

Ozone, also a known phytotoxicant, has been shown to be the cause of tobacco fleck and stippling in grape as well as spotting in many test species at conentrations between 0.1 and 1.0 p.p.m., according to a Walter W. Heck study.

Research by L. G. Wayne, using sensitive indicator plants, has shown that ozone in the dark, and both ozone and nitrogen dioxide in sunlight, react with various olefinic hydrocarbons. These reactions produce various oxygenated organic compounds which singly or in combination react with plant tissues to produce the typical photochemical "smog" injury. The reactivity of specific olefins depends on their concentration, the concentration of the specific oxidant, and the presence or absence of sunlight.

Stephens et al. ("Photochemical Reaction Products in Air Pollution"), demonstrated phytotoxicity from irradiated mixtures of nitrogen dioxide with various olefins, including propylene. The photochemical reaction of 2-butene and nitrogen dioxide was carried out and a phytotoxicant, peroxyacetyl nitrate was isolated as a reaction product, which was shown to produce typical oxidant injuries to sensitive plants as less than 1 p.p.m. Ozone production has been reported as resulting from the photochemical reaction of nitrogen dioxide and various hydrocarbons.

The composition of automobile exhaust gas pollutants depends upon many factors. Major among these are (1) the percentage of aromatics and olefins in the gasoline employed, (2) the physical condition of the automobile combustion chambers, (3) the speed at which the motor is running, (4) the temperature of the motor and the gasoline vapors, (5) the ratio of air (oxygen) to fuel and (6) the control of spark retarding and advance, for example.

Table I illustrates the nature of hydrocarbons in automobile exhaust gas obtained from a 1953 Pontiac at 40 m.p.h. cruise.

TABLE I

Nature of HC's in auto exhaust gas

Percent of total, carbon basis
Methane _____ 12
Acetylenes _____ 16
Ethane _____ 4
Ethylene _____ 19
Propyne _____ 1
Propene _____ 7
Propadiene _____ 1
Butanes _____ 5
Butenes _____ 4
Butadienes _____ 3
Pentanes _____ 7
Pentenes _____ 4
Hexanes _____ 8
Higher HC's by difference _____ 9

It should be noted that ethylene represents 19%, while other "olefins" represent 45% of the exhaust gas hydrocarbons. Thus, the ethylene represents about 30% of the above exhaust gas total olefins, while other olefins cumulatively represent 70%.

A treatment of exhaust gas from a Lauson 6.3 horsepower engine revealed that of the total hydrocarbon content of the exhaust gas, olefins account for 80%, and ethylene represents about 37% of total olefins, while other olefins cumulatively represent about 63%.

Determination of the average content of exhaust gas based on a typical California gasoline of about 35% aromatics and burned at speeds ranging from idle to 30 m.p.h., disclosed the olefin distribution as illustrated in Table II.

TABLE II.—OLEFINS IN L. A. EXHAUST GAS

| No. of Carbons | Mole Percent | Percent Total Olefins |
|---|---|---|
| 2 | 10.0 | 40 |
| 3 | 5.0 | |
| 4 | 4.0 | |
| 5 | 2.8 | 60 |
| 6 | 1.5 | |
| 7 | 1.0 | |
| 8 | 0.7 | |

From Table II, it is seen that ethylene constitutes about 40% of the typical Los Angeles olefins of automobile exhaust gas. The determination also disclosed that the greater degree of olefin production resulted at cruise and acceleration speeds of about 30 m.p.h.

Table III illustrates the final exhaust gas reaction products which are principle smog offenders.

TABLE III.—COMPOUNDS CAUSING SMOG MANIFESTATIONS

| Compound | Eye Irritation | Plant Damage | Reduced Visibility | Rubber Cracking |
|---|---|---|---|---|
| Formaldehyde | X | | | |
| Acrolein | X | | | |
| Peroxyacetyl Nitrate | X | X | | |
| Unstable Ozone-Olefin Complexes | | X | | |
| Nitrate Ester of Cyclic or Di-Olefins | | | X | |
| SO₂-Olefin Copolymers | | | X | |
| Ozone | | X | | X |
| Ethene | | X | | |
| Nitrogen Dioxide | X | | X | |

The compounds illustrated in Table III are primarily derived from olefinic hydrocarbons, nitrogen oxides, air and sunlight via complex photochemical reactions.

Table IV illustrates the contribution to smog from the individual olefin components.

TABLE IV.—COMPONENT [1] SMOG POTENTIALS

| Component | Acrolein | Peroxyacyl-nitrate | Formaldehyde | Ozone | Totals | Relative Values [2] |
|---|---|---|---|---|---|---|
| Ethylene | | | .15 | .23 | .38 | 11 |
| Propylene | | .40 | .40 | .37 | 1.17 | 34 |
| Isobutylene | | .40 | .68 | .66 | 1.75 | 50 |
| 1-butene | | .40 | .45 | .40 | 1.25 | 36 |
| 2-butene | | .80 | | .43 | 1.23 | 35 |
| 2-methyl-2-butene | | .80 | .50 | .26 | 1.56 | 45 |
| 1-pentene | | .40 | .53 | .40 | 1.33 | 38 |
| Tetramethyl ethylene | | .80 | .28 | .43 | 1.51 | 43 |
| 3-heptene | | .80 | .78 | .49 | 2.07 | 60 |
| 1,3-butadiene | 2.40 | .04 | .60 | .43 | 3.47 | 100 |
| n-Pentane | | | | .10 | .10 | 3 |
| 2-methyl heptane | | | | .10 | .10 | 3 |
| Cyclohexane | | | | .14 | .14 | 4 |
| Benzene, acetylene | | | | .12 | .12 | 3.5 |
| P-xylene | | .20 | .40 | .06 | .66 | 19 |

[1] Per mol.
[2] 1-3 butadiene assigned a value of 100.

It has been determined that olefins account for about 90% of the measured harmful potential products of typical exhaust gas, including products such as ozone, peroxyacetyl nitrate (PAN), and aldehydes. Ethylene is slower in reacting than other olefins. Although ethylene is believed to be a major single factor in formaldehyde and ozone production because of its relative abundance in the exhaust gas as illustrated above, it is also highly important to remove the other olefins from the atmosphere since the other olefins constitute from about 60% to 70% of the typical exhaust gas total olefins. Table V illustrates the reactivity, i.e., the disappearance rate, of the olefins, expressed in the number of hours before 50% has disappeared.

TABLE V

Disappearance rate of objectionable olefins produced from irradiation of various hydrocarbons in the presence of nitrogen oxide

| Compound | Hrs. for 50% level |
|---|---|
| Ethylenes | 3–6 |
| Propylenes | 0.6 |
| Butylenes | 0.1, 0.5 |
| Pentenes | — |
| Hexanes | 0.2 |

Health authorities have stated that the control of exhaust gases from automobiles is vitally needed in many urban centers; see for example, W. McDermott, "Air Pollution and Public Health," Sci. Am. 205 (4) (October 1961); J. R. Goldsmith and L. H. Rogers, "Health Hazards of Automotive Exhaust," Public Health Rept. (U.S.) 74, 551 (1959); J. E. Dickinson, "Organic Emissions in Smog Formation," reprint 33, Meet. Air Pollution Control Assoc. (APCA), 1959; M. Neiburger, "Visibility Trend in Los Angeles," Air Pollution Found. Rept. 11 (1955); A. C. Stern, Air Pollution, vol. 1, Academic Press (1961); "Motor Vehicles, Air Pollution and Health," U.S. Public Health Serv., House Document 469 (1962). The reasons for need of this control, as given by health officials, include the following:

(1) The discovery by Professor A. J. Haagen-Smit and confirmation by many others that the well-publicized Los Angeles smog with its eye irritation and reduced visibility is primarily caused by the photochemical interaction of olefinic hydrocarbons, nitrogen oxides, sunlight, and air. This combination leads to a host of partial oxidation products with irritant, toxic, and light-scattering properties.

(2) Information on exhaust composition, gasoline consumption, and other pollution sources showing that about 90% of the olefins and two thirds of the nitrogen oxides in Los Angeles air can be attributed to automobile exhaust.

(3) The presence, in vehicle exhaust, of carcinogenic materials, such as benzpyrene, which may be responsible for increased incidence of lung cancer in urban centers.

(4) Evidence that the rising incidence of chronic bronchitis-emphysema is related to air pollution.

(5) Plant damage from smog in twenty-six California counties which is estimated to be ten million dollars annually.

(6) The continuing development of large metropolitan centers dependent on automobile transport.

(7) The general population growth coupled with the greater per capita automobile usage (seventy million cars in 1962).

(8) The large amount of carbon monoxide emitted from automobiles along with its effect on blood oxyhemoglobin level.

(9) The fairly common occurrence of thermal inversions, particularly in Los Angeles, which prevent the normal flow of ground air to the upper atmosphere. Also, mountainous areas or equivalent weather system situations which prevent lateral flow of the air contribute to the stagnation.

Because of the importance attached to these considerations by health authorities, (1) the U.S. Public Health Service is obtaining the information needed for federal control measures, (2) in 1960 California adopted a state law that will make auto exhaust control compulsory, (3) and automobile manufacturers are installing crankcase recycle devices to eliminate crankcase exhaust.

The various exhaust gas products have the following effects:

(1) Aldehydes, particularly acrolein and formaldehyde, account for most of the eye irritation resulting from photochemical smog.

(2) Peroxy acyl nitrate (PAN) causes both eye irritation and plant damage.

(3) Ozone causes deterioration of rubberlike products, as well as plant damage and possible pulmonary irritation. However, it also serves to help purge the atmosphere of eye irritants by their further oxidation.

(4) Aerosols, containing sulfur oxides together with olefin-derived polymers, cause reduced visibility.

(5) Nitrogen oxide (NO) is a component of exhaust gas, and is eventually oxidized in the atmosphere to nitrogen dioxide ($2NO_2 \rightleftharpoons N_2O_4$) which has the yellow color and irritating effects.

Smog-chamber studies have been extensive enough to rank the various hydrocarbon smog precursors with respect to formation of the major irritants. When exposed to light at very low concentration levels in the presence of oxides of nitrogen, these components form to the degree indicated in Table IV.

Studies show that the cruising and acceleration emissions are much more important than those from idle or deceleration because of the higher olefin content and the higher exhaust flow rate during the former modes. It appears that the olefins having three or more carbons react rapidly and that their elimination would substantially solve the photochemical smog problem. Therefore, although ethylene is the most abundant single components of the exhaust gas olefins and is thereby important, the removal of higher olefins such as propylene appears to be of even greater importance, because as discussed above, the higher olefins constitute from about 60% to about 70% of total olefins.

In addition to olefins and nitrogen oxide constituents of hydrocarbon combustion exhaust gases, the removal of carbon monoxide from such gases and consequently from the atmosphere is also highly desirable in that this material is a known poison (toxicant).

Thus, it is clear that the importance of the control of smog has been recognized. Also, it is clear that automobile gasoline engines have been recognized as major contributors of smog forming hydrocarbon gases. Additionally, as discussed above, it has become apparent that the exhaust gas olefin hydrocarbons are the major offenders.

However, although a recognition of the problem is the first important step, correction of the problem is not easily accomplished.

There are various approaches to solving the automobile exhaust gas smog problem, substantially all of which rely upon further oxidation of the automobile exhaust hydrocarbon gases by various means. Among the most promising means is the employment of catalytic agents which in the presence of sufficient air or oxygen increase the degree of oxidation of the exhaust gas hydrocarbons.

However, when exhaust gas oxidation catalysts are employed in the environment of the line-of-flow of the exhaust gas, and when the catalyst container (converter) thereby becomes a part of the automobile equipment, many new problems arise to complicate the already existing problems of obtaining catalytic agents of selective high activity for the oxidation of particular exhaust gas hydrocarbons such as the olefins. Some of such typical catalyst problems are as follow.

If the size (cross section) of the exhaust gas catalyst particles is too small, the free flow of exhaust gas through the exhaust-gas-converter catalyst bed is retarded by back-pressure. In the discussion of catalysts, the term "particle" includes any one or more of typical physical forms such as extrudates, beads, rings, etc. Automobile engines and exhaust systems are designed in a manner whereby there is a particular built-in, inherent back-pressure in the exhaust system. The California standards permit a maximum increase in back-pressure of only about 25% above the original back-pressure. The requirement is now expressed in terms of percentage change in horse power. Regardless as to the design of the exhaust converter and as to the shape of the catalyst, the minimum cross section is critical in order to avoid excessive back-pressure.

The problem arising from the maximum permissible back-pressure, and thereby from the minimum catalyst particle cross section, is complicated by a counter-problem which limits the maximum cross section, pertaining both to spherical-type and to oblong type, as well as other shaped catalysts. Although minimum cross section is the optimal for reasons discussed below, and although a larger particle of a particular catalyst may be necessary to avoid excessive back-pressure in an automobile exhaust converter, the employment of large particles may result in a channeling of exhaust gases caused, for example, by rearrangement of the catalyst bed, whereby the channeled exhaust gases escape into the atmosphere without undergoing conversion, i.e., the converter is rendered ineffective.

Another problem arises from the inherent over-all pore volume of the particular catalyst. As the pore volume increases, the crush strength decreases whereas the activity after leading increases for the conversion of exhaust gas hydrocarbons.

Another problem arises from the effects of cross section of catalyst on the exhaust catalyst resistance to deactivation as a result of leading arising from the use of leaded fuels. As cross section of the particles increases, the particle accumulates lead at a lower rate. However, as the cross section increases, leaded activity of the overall catalytic bed decreases for exhaust gas hydrocarbon conversion. The phenomenon of greater lead accumulation as cross section of the particles decreases, results from the impingement of the exhaust gas flow upon the catalyst particles making up a catalyst bed. Smaller cross section inherently results in a more compact bed and greater impingement.

Separation of dust or mist by packed beds is due to several factors including the following:

(1) gravity settling
(2) Brownian Movement
(3) impingement
(4) interception
(5) electrostatic attraction Separation by impingement is controlling at high gas velocities encountered in exhaust converters. The collection efficiency by impingement is defined by the following equation:

$$\text{efficiency} \approx \left(\frac{U_t}{g_L} \cdot \frac{V_o}{D_p}\right)$$

where:

$U_t$ = terminal settling velocity of the dust or mist.
$V_o$ = gas velocity in the bed.
$g_L$ = gravitational constant.
$D_p$ = diameter of the catalyst particle.

Note here that collection efficiency increases with decreasing particle diameter.

Although an increase in the cross-section of an exhaust catalyst decreases the catalyst rate of lead accumulation resulting from leading, a counter-problem arises from the requirement that an exhaust catalyst be characterized by a low ignition temperature. The temperature at which any particular catalyst becomes effective to oxidize the hydrocargon gas is termed the "catalyst ignition temperature." The high ignition temperature of $V_2O_5$, for example, results in long initial periods of warm-up and nonconversion of gases, thereby resulting in a high degree of air pollution prior to the obtaining of the ignition temperature. The counter-problem arises from the fact that catalyst particles of large cross section form a less compact catalytic bed than is formed by catalyst particles of a small cross section, when employed as a catalytic bed in an automobile exhaust converter. Because the larger particle catalysts are less effective for the impingement separation of lead aerosols from the exhaust gases, the entire catalyst bed rapidly loses a substantial degree of its activity whereby the ignition temperature is substantially raised thereby permitting large quantities of smog forming exhaust gases to pass into the atmosphere. In contrast, the smaller particles, i.e., particles having a small cross section, form a more compact (wall-space) catalytic bed and have greater impingement (1) whereby catalyst particles closest to an exhaust converter inlet collect a substantial portion of the lead and (2) whereby the remainder of the catalytic bed retains a high degree of activity thereby retaining a low ignition temperature and preventing uncontrolled pollution of the atmosphere. Thus, a small cross section is necessary in order to prolong the effective life and a low ignition temperature of the catalytic bed.

On the other hand, when particle cross section is decreased, it is concurrently necessary that the catalytic support in the automobile exhaust converter have perforations which are smaller so that the catalyst will not be blown through the perforations or will not filter through the perforations. The requirement that these perforations be smaller than the catalyst particles employed in a catalytic bed of an automobile exhaust catalyst is often frustrated by the tendency of the small perforations to become plugged, whereby excessive back-pressure results and whereby rupture of the automobile exhaust converter or channeling of the exhaust gases through the catalytic bed may result.

Thus, in order to be successfully employed in an automobile exhaust converter, the cross section of the exhaust gas catalyst particles cannot be less than a particular minimum, in contrast to the several problems already discussed above relating to cross section of the catalyst.

The obtaining of a satisfactory catalyst is further complicated by the fact that the catalyst is subject to varying conditions such as starting and stopping the motor, with periods of running a cold motor, and alternatively of periods of extenisve use where the engine heat is at a high level. The problem of overheating is typically illustrated by Table VI.

TABLE VI

| Automobile Speed Driving Mode | Potential Temperature (° F.) Contribution | | | |
|---|---|---|---|---|
| | Hydrocarbon | CO+H$_2$ | Sensible Heat (Degrees; ° F.) | Total Temperature ° F. |
| Idle | 250 (±) | 800 (±) | 200 (±) | 1,250 (±) |
| 0-25 | 500 (±) | 500 (±) | 150 (±) | 1,150 (±) |
| 30 | 450 (±) | 600 (±) | 150 (±) | 1,200 (±) |
| 30-15 | 400 (±) | 1,100 (±) | 400 (±) | 1,900 (±) |
| 15-30 | 650 (±) | 350 (±) | 150 (±) | 1,150 (±) |
| 50-20 | 600 (±) | 750 (±) | 1,350 (±) | 2,600 (±) |
| 40 | 650 (±) | 350 (±) | 200 (±) | 1,200 (±) |
| 50 | 900 (±) | 350 (±) | 150 (±) | 1,400 (±) |
| 20 | 300 (±) | 500 (±) | 350 (±) | 1,200 (±) |
| 30-0 | 350 (±) | 1,100 (±) | 450 (±) | 1,900 (±) |
| 0-60 | 750 (±) | 950 (±) | 100 (±) | 1,800 (+) |
| Weighted Value (Cal. Test) | 500 (±) | 550 (±) | 225 | 1,325 |

A catalyst retains its activity for the conversion of exhaust gas hydrocarbons and carbon monoxide only so long as it is not subjected to continuous excessive temperatures resulting from overheating. The typical exhaust gas contains about 15% water vapor, and the catalyst bed is, therefore, continually subjected to steaming as well as many other assorted reactions. Overheating accelerates the loss of catalyst activity. Additionally, excessive exhaust pressures may be exerted upon the catalyst at excessive temperatures. The physical container and adjacent automobile parts also cannot withstand continual excessive temperatures.

Another problem specific to the automobile exhaust gas converters is that many catalysts having (1) a low ignition temperature have (2) a high effectiveness in carbon monoxide conversion but have (3) low effectiveness for hydrocarbon conversion. With these type catalysts, when a sufficiently large amount of oxygen (or air) is employed to obtain higher hydrocarbon conversion, the degree of carbon monoxide conversion concurrently proceeds at such a high rate that the automobile exhaust gas converter overheats and thereby (1) damages the catalysts, (2) tends to rupture the converter container, and (3) possible sets on fire adjacent automobile parts such as the floor padding. Thus, many catalysts having a low ignition temperature are not satisfactory for an automobile exhaust gas converter because (1) hydrocarbon conversion is too low at practical $O_2$ (oxygen) levels; and/or (2) when $O_2$ level is sufficiently increased to obtain satisfactory hydrocarbon conversion, the adverse affects of overheating are encountered. As stated above, another requirement of catalyst utilization is a rapid warmup of the catalyst bed. However, many catalysts require a substantially high temperature of the catalyst itself, before the catalyst becomes effective to oxidize hydrocarbon components of gas of exhaust gas.

Another typical problem arises in attempting to select an appropriate catalyst for an exhaust gas automobile converter in that (a) the maximum permissible back-pressure and (b) the lack of space available beneath the automobile limit the maximum amount of catalyst through which the exhaust gas may be passed, while concurrently there is the problem of (1) obtaining a high conversion of total hydrocarbons, (2) a high conversion of ethylene gas, (3) a high conversion of olefin gases having three or more carbon atoms, (4) a high conversion of carbon monoxide to carbon dioxide, (5) a rapid warmup, resulting from a low ignition temperature, (6) a high conversion of olefins and carbon monoxide at safe converter operating temperatures, and at temperatures which do not substantially adversely affect the caalyst, and all of the other typical requirements referred to above. No single catalyst disclosed by the prior art meets these stringent requirements of an automobile exhaust gas converter. There is no suggestion in the prior art that random mixtures of single catalysts would overcome the above many problems associated specifically with an automobile exhaust converter. Experiments demonstrate that random mixtures do not necessarily improve any one or more of the required properties of catalyst, such as ignition temperature or increased conversion of olefins or of carbon monoxide, for example.

Although it is known that the percentage of conversion (oxidation) of exhaust hydrocarbons and carbon monoxide may sometimes be increased by increasing available air or oxygen content of the exhaust gas prior to the conversion, problems arise from the fact that as the oxygen concentration is increased, overheating and excessive temperatures may be encountered, with all of the accompanying difficulties discussed above. Also, depending upon the nature of the hydrocarbon to be converted, the percentage of conversion sometimes decreases when oxygen is present in excess of a particular maximum. Additionally, the presence of too much oxygen or air sometimes, depending upon the particular catalyst, causes a greater degree of carbon monoxide conversion with the accompanying excessive temperatures, without necessarily substantially increasing the percentage conversion of exhaust gas hydrocarbons such as olefins.

Another problem encountered by increasing the amount of air or oxygen in an attempt to increase the percentage of conversion of hydrocarbon gases such as olefins, and conversion of carbon monoxide, is that the air or oxygen being introduced into the exhaust gas prior to passing the exhaust gas through the catalyst bed of the converter tends to cool the exhaust gas, whereby the exhaust gases are less susceptible to being converted and whereby the unconverted exhaust gases continue to pass through to the atmosphere.

Thus, it is apparent that there are many complex considerations and problems to be overcome in the producing of a catalyst which is satisfactory for an automobile exhaust gas converter and which will effectively meet the needs of the public in reducing or eliminating smog and other atmospheric contaminations associated with automobile exhaust gases.

A catalyst of high crush strength comparatively stable to lead poisoning and to steaming, characterized by a short warmup time (therefore reaching maximum efficiency quickly), effective for oxidizing the hydrocarbons in exhaust gases which contribute to photochemical smog as well as for effecting some decrease in carbon monoxide, a known poison, would be a highly desirable contribution.

Accordingly, it is an object of the present invention to provide a catalyst material for the oxidation of automobile combustion exhaust gases which is highly effective in oxidizing the smog forming components in exhaust gases, which effects oxidation of carbon monoxide and hydrogen at a controlled rate.

Another object is to obtain a novel automobile exhaust gas catalyst characterized by a high effectiveness for conversion of ethylene in exhaust gas.

Another object is to obtain a novel automobile exhaust catalyst characterized by a high effectiveness for conversion of olefins of three or more carbon atoms.

Another object is to obtain a novel automobile exhaust catalyst characterized by a high effectiveness for conversion of carbon monoxide.

Another object is to obtain a novel automobile catalyst characterized by a low ignition temperature.

Another object is to obtain a novel automobile exhaust gas catalyst characterized by a high effectiveness at a moderately low temperature, for maximal conversion of both hydrocarbon olefins and carbon monoxide.

Another object is to obtain a novel automobile exhaust gas catalyst characterized by a high crush strength.

Another object is to obtain a novel automobile exhaust gas catalyst characterized by a high crush strength stability to steaming.

Another object is to obtain a novel automobile exhaust gas catalyst characterized by a high activity stability to lead poisoning by leaded gasolines.

Another object is to obtain a novel automobile exhaust gas catalyst characterized by a high level of pore volume and a high crush strength.

Another object is to obtain a novel automobile exhaust gas catalyst characterized by a maximum of internal surface area.

It is a further object of the present invention to provide a catalyst which is effective with low exhaust gas temperatures such as are encountered during warmup, idling or low speed operation and which remains active even after continued usage with leaded gasoline.

A further object of the present invention is to provide a catalytic material for the oxidation of hydrocarbon combustion exhaust gases in which the catalyst material may be a mixture of catalytic agents or may be a single homogeneous catalyst composition. As will be seen hereinafter, this facet of the present invention provides an additional dimension thereto, enabling the performance characteristics of the catalyst to be varied easily over a comparatively wide range and in addition, contributes to the economic advantages of the present invention.

A further object of the present invention is to provide a process employing a novel catalyst for the treatment of exhaust gases in which a broad spectrum of the undesirable constituents therein are greatly reduced.

These and other objects and advantages of the present invention will become more apparent from the detailed description thereof set forth hereinbelow.

The applicant's automobile exhaust gas catalytic composition, when employed in an automobile exhaust gas converter, obtains the above objects. For example, the applicant's exhaust gas catalytic composition, employing $V_2O_5$ and a copper compound such as copper oxide as necessary components, and preferably additionally employing at least one catalyst selected from the noble metals (1) overcomes the overheating problem specific to automobile exhaust gas converters, (2) is characterized by a low ignition temperature, thereby requiring only minor warming up periods, (3) obtains a high percentage conversion of both carbon monoxide and total hydrocarbons, particularly of ethylene and olefins of three or more carbon atoms, and (4) has a high stability to both lead poisoning and to steaming conditions while concurrently being highly active at a small cross section of the catalyst particle.

According to the present invention, the oxidation catalyst comprises a major portion of alumina, and as catalytic agents, between about 2% and about 10% vanadia ($V_2O_5$) and between about 2% and about 10% of copper, or copper compound such as copper oxide, the percentage of copper being expressed in terms of the weight of elemental copper. Additionally, it is advantageous to include from between about 0.01% (100 p.p.m.) to about 0.03% (300 p.p.m.) of paladia, or an equivalent amount of some other noble metal. The noble metal normally is employed as a salt. The particular noble metal employed should be one which will more effectively catalyze the oxidation of hydrogen, carbon monoxide, ethylene, propylene, and higher olefinic components of the combustion exhaust gases at low temperatures, i.e., at temperatures less than about 400° C. to about 450° C., than the $V_2O_5$ catalytic component of the catalyst. Thus, according to the present invention, the exhaust gas converter catalytic composition includes vanadia and a copper compound, preferably copper oxide, as essential components, and advantageously, includes a minor percentage of one or more such as platinum, palladium, rhodium, iridium, ruthenium, and osmium. Other copper compounds typically include either or both cupric and cuprous salts of chloride, cyanide, nitrate, ferricyanide, ferro-cyanide, fluoride, sulfide, sulfite, thiocyanate, acetate carbonate, oxides, and mixtures thereof.

As discussed above, the utilization of a catalyst in an automobile exhaust gas converter raises many problems not ordinarily encountered in the catalyst art. Accordingly, in order to have the required crush strength, stability to steaming and to lead poisoning, permeability to gas flow to prevent excessive back-pressure, catalytic activity for the conversion of hydrocarbons and carbon monoxide, low ignition temperature, and other requirements discussed above, it is critical that the applicant's catalytic composition have a pore volume of about 0.7 to about 0.9 cc./g., and a particle size having a minimum cross section of about $\frac{1}{20}$ inch (0.05 inch) to about $\frac{1}{5}$ inch (0.20 inch).

The catalyst compositions of this invention may be prepared by impregnating a suitable alumina base with a prescribed amount of $V_2O_5$, i.e., vanadium pentoxide, followed by impregnating with the second catalytically active materials described hereinabove. Alternatively, the impregnation procedure may be reversed, i.e., the second catalytic materials being the first impregnant, followed by impregnation with $V_2O_5$.

A second and important aspect of the catalyst composition of this invention relates to a composition which in essence may be described as a physical mixture of a $V_2O_5$ impregnated alumina with an alumina base material activated with the second catalytic material. This method of preparation and the catalyst compositions resulting therefrom result in substantial flexibility in catalyst compositions of this invention in that the relative amounts of catalytically active components may be varied quite readily by the simple addition or subtraction of one of the optional components. Since units for different cars will require varying amounts of low temperature heat release, depending on location of the catalytic unit and exhaust composition, this flexibility is important. Additionally, where the catalytically active material includes a noble metal, by using physical mixtures of the two essential catalytic components, the noble metal is more easily recovered after use, which is an important economic advantage.

As compared with $V_2O_5$-alumina catalyst heretofore used for the oxidation of hydrocarbon combustion exhaust gases, the catalyst composition of the instant invention has several marked advantages. It results in more effective oxidation of harmful ethene, propylene and carbon monoxide, in the environment of an automobile exhaust converter. The presence of at least one copper compound and preferably a third catalytic agent, as for example, platinum, results in a substantially faster warmup of the catalyst bed in comparison with that of $V_2O_5$-alumina catalyst. Faster warmups of the catalytic bed result principally from the oxidation of hydrogen and carbon monoxide by the second catalytic component which performs more effectively at low temperatures than the $V_2O_5$-alumina portion of the catalyst composition. This oxidation at low temperatures of the above-identified constituents of combustion exhaust gases results in the rapid release of heat due to the oxidation of these constituents, which in turn causes the entire catalyst bed to warm up substantially immediately and thereby renders the $V_2O_5$-$Al_2O_3$ component active for hydrocarbon oxidation. Thereby applicant's novel composition obtains the desirable low ignition temperature.

Random catalytic composition catalysts of solely a copper compound such as CuO, and/or solely a noble metal, although very active and highly effective oxidation catalysts for hydrogen and carbon monoxide, are in themselves not suited for catalytic muffler usage in the absence of the $V_2O_5$-alumina catalytic component. This is true because their use (without vanadia) requires the supply of sufficient additional oxygen to completely react with the carbon monoxide and hydrogen before very effective conversion or oxidation of hydrocarbon constituents of the exhaust gases can be realized. This means high air or oxygen requirements which in turn means large capacity air induction devices which are not always adaptable to an automobile exhaust gas converter system.

Additionally, where high oxygen requirements exist, the heat released from the rapid and near complete oxidation of carbon monoxide, hydrogen and to a lesser extent hydrocarbons, results in a rise of the temperature of the catalyst bed to very high temperatures which can damage the catalyst and the container thereof, as well as affect nearby components in an automobile or other apparatus employing an internal combustion engine if the container and exit pipe are not well insulated, as discussed above. Further, hot exhaust gases also present a safety problem, such as possibly causing a fire.

Moreover, catalysts containing noble metals (without $V_2O_5$) as an active catalytic component have a high susceptibility to lead poisoning from leaded fuels at high temperatures, and as is well known the noble metal catalysts are comparatively expensive.

The combination of vanadium pentoxide ($V_2O_5$) and a copper compound such as CuO, preferably with at least one catalytic noble metal such as palladium or platinum, with alumina base material in the amounts described has to a substantial extent overcome the disadvantages of either a copper compound or a noble metal catalyst employed alone. Thus, warmup times are substantially reduced, resulting in a catalyst composition that is effective in very short periods of time, and a catalyst is provided which is effective for ethene (ethylene), as well as higher olefinic hydrocarbons, and furthermore results in substantial carbon monoxide oxidation without requiring large capacity air induction devices. Additionally, the catalyst of this invention maintains activity after long usage with leaded gasoline.

As noted above, the oxidation catalyst composition of this invention on an overall basis contains a major portion of alumina and from between 2% and about 10% of $V_2O_5$, from between about 2% and about 10% of a copper content, and preferably from about 0.01% to about 0.03% of a noble metal. A preferred catalyst composition contains a major portion of alumina, between about 4% and 7% of $V_2O_5$ and between about 3% to about 7% of copper-content, and preferably about 0.01% to about 0.015% of a noble metal. When the third catalyst agent is one of the less desirable noble metals, it is preferably employed in amounts of between .3 or more by weight of the total catalyst. The typical catalyst composition, also a preferred embodiment, contains a major portion of alumina, about 5% $V_2O_5$, about 7.5% CuO (about 6.0% copper-content), and about 0.01 palladium-content, by weight of the total catalyst.

It is frequently advantageous to employ an alumina which is silica stabilized. By expression "silica stabilized" is meant an alumina which contains from about 2% to about 10% silica. The preferred composition includes about 5% silica. The use of this type alumina as base material produces a more stable catalyst which is markedly more resistant to shrinkage upon drying and calcining.

The terms "stability" and "stabilize," as used herein, refer broadly to typical exhaust gas catalyst-particle properties such as (1) ability to retain activity after steaming, (2) resistance to lead poisoning, (3) resistance to crushing and to attrition after exposure to high temperature and steaming conditions, etc.

Any catalyst containing $V_2O_5$ in excess of about 10% by weight, frustrates its suitability for use in an automobile exhaust gas converter (1) because vanadia presence causes a substantial loss in the crush strength of the exhaust gas catalyst and (2) because a substantial loss in crush strength results in vanadium dust which is highly toxic and which could constitute a safety hazard.

In all catalyst compositions, exclusive of the $V_2O_5$ and Cu-compound catalytic agents, the balance is essentially alumina, for this invention.

The alumina employed in this invention may be any of a broad class of aluminas, which may be generally characterized as gamma alumina, derived from alumina hydrogels, alumina xerogels, alumina α-monohydrate, sintered alumina, alumina α-trihydrate, or the like, all of which may be prepared according to methods described in the prior art. It must be free of substantial amounts of alkali metal impurity and preferably contains less than .05% of such impurities.

According to one procedure, a suitable alumina for catalytic purposes may be prepared by precipitation from a solution of an alkali metal aluminate such as sodium or potassium aluminate, as a result of the addition of an acid such as sulfuric acid or aluminum sulfate, for example as commercial alum. When such hydrated alumina is spray dried, it is usually characterized by a low apparent bulk density, usually within the range of about 0.2 to about 0.3 gram per cc. Such a base material is well suited for use in the present invention and may be prepared in accordance with the procedure described in U.S. Patent 2,657,115, the subject matter of which is incorporated herein by reference. The preferred catalyst must be calcined before impregnating with vanadia, either before or after forming the particle. Calcining the alumina particle before impregnation is preferred.

In accordance with a suitable procedure for preparing the present catalyst, a suitable precipitated alumina is intimately contacted with a compound which yields $V_2O_5$ after calcination, such as ammonium metavanadate or the complex resulting from the interaction of ammonium metavanadate, oxalic acid and ammonia, described in U.S. Patent 1,914,557. The calcined alumina, prior to impregnation with $V_2O_5$ may be in powder, pellet, precipitate or extrudate form. It may then be dried and calcined, as for example, at temperatures of from 200° F. to 1100° F.

Preferably, before impregnation with $V_2O_5$, the alumina is spray dried. Spray drying of a suitable alumina base material may be accomplished by any suitable spray dryer. One that has been employed with success is described in U.S. Patent 2,644,516, dated July 7, 1953. Although a gas inlet temperature of up to 1300° F. may be employed, the temperature of drying gases entering into the spray drying chamber is preferably controlled within the range of about 400–1000° F. so that the catalyst material is converted into set partially dehydrated microspheroidal gellike particles. Spray drying of the alumina hydrate usually results in a moisture content of from between 15–30% of the spray dried product.

The resulting $V_2O_5$-alumina catalyst material may then be dried, and optionally calcined prior to being combined with a copper compound such as a copper salt which subsequently decomposes into CuO, and optionally but preferably is subsequently impregnated with a suitable noble metal. Alternatively, in the preferred embodiment, the copper compound and the noble metal may be jointly impregnated. Additionally, it may be dried and calcined preliminary to mixing with a suitable alumina base impregnated with a noble metal as for example, platinum. If the $V_2O_5$-alumina component is to be further impregnated such impregnation is preferably carried out with suitable solution of such materials as for example, their halides and in particular their chlorides and fluorides, such as chloroplantinic acid, platinum tetrachloride, palladium chloride and other water-soluble salts, known to those in the art. Such impregnations are usually carried out by procedures or techniques which insure the deposition of suitable amounts of the noble metal in the final catalyst, as for example, by pore saturation techniques, titration and the like. Thereafter, the multicomponent catalyst composition may be dried, as for example, overnight at 250° F. and then calcined, usually at temperatures of from between about 1100° F. and about 1400° F. for periods of from between about 1 and 3 hours and preferably from about 1200° F. to about 1300° F. High temperature calcination serves to reduce shrinkage on high temperature usage, and to increase activity.

Catalyst materials so prepared, if not in pelleted or other suitable physical form, are then preferably pelleted by employing conventional pelleting equipment or extruding appartaus in accordance with procedures well known in the art. Thereafter, following extrusion or pelleting, the catalysts are again calcined, usually at temperatures of 1100–1400° F. for 2 hours or more.

It has been determined that the catalyst employable in the present process should have an internal surface area of at least 40 $M_2$/gm. Whether an initial catalyst or alternatively a used catalyst such as one subjected to steaming conditions, the applicant's catalytic composition is limited to the minimum of 40 $M_2$/gm. (as measured by nitrogen absorption) because a lesser surface area would be substantially inactive as an automobile exhaust gas catalyst. The catalyst may be beaded, pelleted, ringed or any other suitable physical form. Normally, the catalyst will be in the form of cylindrical extrudates or pellets characterized by a diameter of less than about 0.2 inch per unit because of diffusion, lead poisoning and activity considerations, but to insure no significant pressure drop and good attrition properties, normally they should not be less than about 0.05 inch per particle, in diameter. Normally, these catalysts will have lengths equal to from about 1 to 4 diameters. The following formula is employed for purposes of determining the relative back-pressure which would result from two separate catalyst compositions of different cross sections. The first catalyst has a cross section (diameter) of (a) 0.07 inch, and the second has a cross section of (b) 0.049 inch. Where the cross section 0.070 represents unity, the relative pressure drop caused by the catalyst of 0.049 inch cross section is 1.465, based on the formula:

$$\frac{(Pa-Pb)}{6LpV^2} \frac{gcE^3 Dp}{(l-E)} = F*$$

Where:

F = a friction factor
E = Void volume/unit volume of bed
$l$ = E+pore vol./unit vol.+skeletal volume $(Al_2O_3)$/unit vol.
$E = l - PV/cc. - SV(Al_2O_3)$ $$SV = \frac{(g. \ Al_2O_3)}{cc.} \times \frac{l}{\text{Skeletal Density}}$$

$$SDAl_2O_3 = 2.8 = BD \times \frac{1}{SD}$$

Therefore, $$E = 1 - PV \times BD - \frac{BD}{SD}$$

$$E = 1 - BD\left(PV - \frac{1}{SD}\right)$$

this is the formula for the void volume.

* See: (1) Chemical Engineers Handbook, John H. Perry, 3rd Edition, p. 394; and (2) Unit Operations of Chemical Engineering, Warren L. McCabe, Julian C. Smith, pp. 96–98.

It is important that the catalysts be characterized by the physical properties described above, in order that a substantial number of these pellets may be employed in a given converter unit of sufficient-sized configuration, while concurrently avoiding the development of significant back pressure in an exhaust system, which back pressure would result in the diminishing of power and efficiency of a given engine, and which could cause the automobile exhaust gas converter to become ineffective for future conversion of the gases, as discussed above.

In accordance with the above-mentioned alternative methods for preparing the catalyst materials of this invention, after the impregnation of a suitable alumina with vanadium pentoxide, the material may be pelleted as in conventional pelleting or extrusion apparatus and thereafter dried an calcined. If these pellets are not to be further impregnated with a copper compound and a noble metal, but are to be physically blended with a copper compound and a noble metal on alumina catalyst mate-metal, but are to be physically blended with a copper compound and a noble metal on alumina catalyst material, a suitable alumina base is impregnated with metallic Cu or with a copper compound, and preferably also with a suitable noble metal salt. The suitable alumina base is preferably in the ultimate physical form of the catalyst, that is, as a pellet, bead or otherwise formed base. A suitable noble metal salt may be, for example, chloroplatinic acid prepared in accordance with the procedure and the art well developed in the area of catalysts for the reforming of petroleum hydrocarbons, as for example, those described in U.S. Patent 2,479,109, U.S. Patent 2,840,514 and U.S. Patent 2,840,527. The disclosures contained in these patents are typical of prior art developed in the reforming catalytic field and are incorporated herein by reference. After impregnation of the alumina base with copper and preferably also with the noble metal, the copper-noble metal-alumina catalytic component is dried in accordance with well known procedures such as those described in the above referred to patents and the pellets are calcined.

The step of calcining prior to use of the catalyst is optional. Regardless of whether the catalytic composition comprises uncalcined multicomponent catalyst particles (such as $V_2O_5$-CuO-Pt-$Al_2O_3$), or is an uncalcined mixture of catalytic elements, the final composition of the catalyst of this invention performs substantially the same, because normal operating temperatures of an automobile exhaust converter are sufficiently high to calcine the components.

In accordance with the process aspects of the present invention, the automobile combustion exhaust gases of hydrocarbon fuels are oxidized by contacting the exhaust gases with a catalyst of this invention, of the type described above. These hydrocarbon combustion exhaust gases normally leave the combustion chamber of most conventional internal combustion engines, as for example those employed in automobiles and trucks, at a temperature of from between about 300 to about 700° C. depending principally upon engine speed.

In employing the catalyst of this invention and the process of this invention, pellets are normally introduced into a converter unit which in turn may be inserted into the exhaust system of the internal combustion engine. "Converter" as that term is employed herein refers to any suitable container for the catalyst particles of this invention which preferably is capable of being inserted into the exhaust system of an internal combustion engine, as for example, before or after or in lieu of a muffler, after the exhaust manifold, or other convenient locations. Such a converter preferably should be employed in the system in a region where the temperature of the exhaust gases of from between about 300° C. and about 725° C. In accordance with the present invention, such a converter is preferably equipped with a means of insuring controlled air induction so that the flow of air with the flow of exhaust gases as the time of contacting the oxidation catalyst is approximately .05 to 3.0 cubic feet of air per minute. The flow rate should be such that it substantially maintains an $O_2$ concentration of at least about 2% and below about 6%. Oxygen or air flow substantially in excess of about 6% $O_2$ substantially increases the incidence of cooling of catalyst bed or alternatively of overheating, discussed above. The catalyst of this invention is novel in that, for example, high olefin conversion is obtained within these requirements. This air rate is such that catalyst temperatures will reach but normally not exceed 725° C.

The fixed controlled air rate to achieve a maximum catalyst temperature of 725° C. is different for different cars because of such factors as engine size and position of the catalytic unit in the car. Larger engines will require more air. With the catalytic unit at the rear of the car, more air will be required than one having the unit nearer the exhaust manifold.

The employment of controlled (fixed) air flow is an important part of this invention since it can result in near constant and optimum catalyst temperature. That is, at low exhaust rate (idling and low speed) when carbon monoxide and hydrogen content are normally high and exhaust temperature is low (300–400° C.) the ratio of oxygen reacting to total gas is high for an active catalyst so that adiabatic heat rise is also high. On the other hand, at high speeds when exhaust temperature is high (500–650° C.) and carbon monoxide, hydrogen and hydrocarbons low, the ratio of total oxygen to total gas is low so that adiabatic heat rise is low. The net effect is to maintain a near constant temperature and realize optimum performance. Inlet oxygen levels to the catalyst and gas temperatures at fixed air induction (2.0 c.f.m.) will vary with engine speed in terms of miles per hour on a normal 6 cylinder car about as illustrated in Table VII below.

TABLE VII

| Engine Speed, m.p.h.* | Air Plus Exhaust, Percent O$_2$ | Estimated Exhaust Temperature, °C. |
|---|---|---|
| 10 | 4.0 | 325 |
| 20 | 2.9 | 400 |
| 30 | 2.3 | 490 |
| 50 | 1.8 | 600 |
| 60 | 1.6 | 680 |

*Reading on speedometer of jacked up car. M.p.h. approximates c.f.m. of exhaust.

Figure 1:
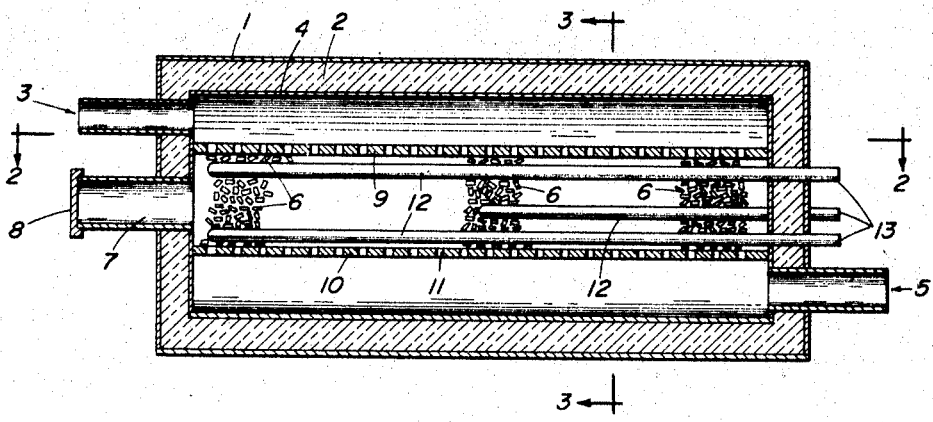
Figure 3:
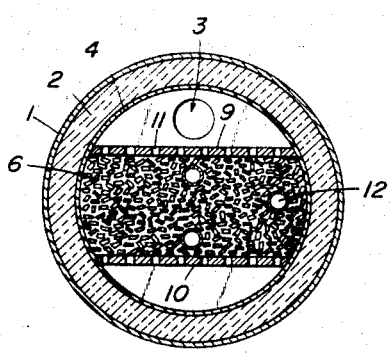
Figure 4:
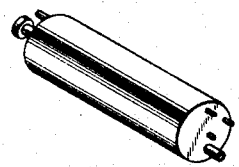

As exemplary of a suitable converter employable in the process of this invention, the converter illustrated in the accompanying drawing may be employed in which drawing:

FIGURE 1 is a side elevation of said converter;
FIGURE 2 is a top sectional view along the line 2—2 of FIGURE 1;
FIGURE 3 is a vertical sectional view along the line 3—3 of FIGURE 1; and
FIGURE 4 is a perspective view of the converter.

This converter unit consists of a cylindrical housing 1 insulated by asbestos or other suitable insulating material 2 having an inlet 3 to its interior 4 and outlet 5 therefrom.

Catalyst pellets 6 are placed in the interior 4 of the converter unit through opening 7 having a removable cap 8 positioned thereover. Catalyst pellets 6 are positioned between vertically spaced parallel grid plates 9 and 10 having uniform perforations therein 11. In order to determine accurately the temperature in various parts of the catalyst bed of the converter unit, thermowells 12 are positioned in the converter unit between grid plates 9 and 10 with exposed ends 13 so that temperature readings within the catalyst bed are readily obtainable.

The inlet pipe 3 and the outlet pipe 5 may be threaded (not shown) or otherwise suitably mechanically adapted for being removably positioned into an exhaust system as, for example, at about a foot's distance from the exhaust manifold.

In operation exhaust gases entering through inlet 3 at high velocity are forced down through upper grid plate 9 through the catalyst particles 6 fixed through grid plate 10 and the oxidized gases exit through outlet pipe 5 ultimately for transmission into the atmosphere.

In accordance with the present process, oxygen, preferably as air, is fed to the exhaust line or directly to the converter as by means of a suitable venturi device or air pump not shown. Such devices are adaptable to providing the amount of air specified above.

In order that the present invention may be more fully understood, the following examples are given primarily by way of illustration. No details or enumerations contained herein should be construed as limitations on the present invention, except insofar as they appear in the appended claims. All parts and percentages are by weight unless otherwise designated.

Example 1

554 g. of water and 481 g. of ammonium metavanadate are slurried together in a suitable mixing vessel and warmed with mixing to 50° C. 780 g. of oxalic acid are added slowly over a period of ½ hour, controlling the temperature at from between 50° and 60° C. The solution is agitated until the evolution of carbon dioxide has ceased and thereafter cooled to 25° C. with the slow addition of 173 g. of 28.1% ammonia.

1250 g. of gamma alumina prepared by the reaction between alum and an alkali metal aluminate which had been spray dried and calcined for 1 hour at 700° F. was added to a muller and the solution prepared above added thereto and the mix mulled for one hour. The resulting composition was then extruded to 1/16″ extrudates, dried overnight at 250° F. and calcined for one hour at 1100° F.

Example 2

52.5 lbs. of alumina extrudates, the alumina of which was derived from alum and an alkali metal aluminate were impregnated by multiple impregnations at 80–100° C. with solutions of ammonia metavanadate and water to yield a final product which contained 13% $V_2O_5$ on a calcined basis. The catalyst is illustrated in Tables IX, X, XI, and XII. Additionally, a catalyst of the same general type is illustrated in Table XV.

Example 3

Gamma alumina, made from a sol according to U.S. Patent 2,274,434 was impregnated with an aqueous solution of chloroplatinic acid and aluminum chloride hexahydrate to yield a product upon drying and calcination at 1100° F. which contained 0.3% platinum and 1.1% chloride.

Example 4

One hundred grams of 1/16″ alumina extrudates were impregnated with a solution of $Cu(NO_3)_2 \cdot 3H_2O$ and water (33.6 gm. $Cu(NO_3)_2 \cdot 3H_2O$ diluted to 75 cc. with water).

The alumina extrudates were titrated with the cupric nitrate solution to a pore volume end point. The resulting catalyst was then dried overnight at 250° F. and calcined one hour at 1100° F.

9.9 grams (15 cc.) of the above catalyst containing 10% of CuO was physically admixed with 20.2 grams (35 cc.) of $V_2O_5$-$Al_2O_3$ containing 13% $V_2O_5$.

The over-all catalyst contained 3% CuO, about 9% $V_2O_5$ and the balance alumina.

Example 5

Fifteen pounds of silica stabilized (2% $SiO_2$) alumina in 1/16″ bead form were impregnated with ammonium metavanadate. After impregnation, the material was dried at 250° F. for 70 hours. On analyzing, the material was shown to contain 10.4% $V_2O_5$.

16.58 pounds of the above material were impregnated with 3230 cc. of a water solution containing 1.27 grams of palladium chloride so as to saturate the pores. The impregnated material was dried overnight at 250° F. and subsequently calcined one hour at 1100° F. The final product contained 10.4% $V_2O_5$, 0.01% palladium, and 1.8% $SiO_2$ on $Al_2O_3$.

Example 6

Catalyst containing 10% $V_2O_5$ and 100 parts per million palladium prepared as described in Example 5 was impregnated with copper nitrate solution by the pore saturation method using 65 g. of Example 5 catalyst and 39 cc. of a copper nitrate solution containing 10.3 g. of $Cu(NO_3)_2 \cdot 3H_2O$ in water.

The saturated catalyst was dried overnight at 250° F. and calcined for one hour at 1100° F. yielding a product containing: 10% $V_2O_5$, 4% copper oxide and 100 parts per million of palladium.

Example 7

Sixty four pounds of silica stabilized alumina (2% $SiO_2$) in the form of 1/16″ beads were impregnated with ammonium metavanadate to give a final product which contained 10% $V_2O_5$ after drying at 250° F.

Twenty two pounds of the dried $V_2O_5$-$Al_2O_3$ were impregnated with 4610 cc. of a water solution containing 937 g. of $Cu(NO_3)_2 \cdot 3H_2O$ and 1.7 g. of palladium chloride so as to saturate the pores. The impregnated material was dried overnight at 250° F. and calcined for two hours at 1100° F. so as to give a final product containing 10% $V_2O_5$, 100 parts per million palladium and 3% copper oxide.

Example 8

Catalyst containing 11% $V_2O_5$ and 100 parts million of palladium prepared as described in Example 7 was impregnated with copper nitrate solution by the pore saturation method using 70 g. of Example 7 catalyst and 39 cc. of copper nitrate solution containing 23.6 g. Cu(NO₃)₂·3H₂O in water. The saturated material was dried for 70 hours at 250° F. and one hour at 1100° F., so as to give a product containing 10% V₂O₅, 100 parts per million palladium and 10% copper oxide.

Example 9

Example 5 catalyst (7.7 pounds) used in a catalytic muffler on a 1950 Hudson with leaded gasoline for 1100 miles was impregnated with 1840 cc. copper nitrate solution containing 328 g. of Cu(NO₃)₂·3H₂O so as to saturate the pores and give a product containing 3% CuO. The saturated product was dried at 250° F. and calcined for one hour at 1100° F.

Example 10

200 g. of gamma alumina (silica stabilized, 2% SiO₂) were impregnated with a slurry of ammonium metavanadate. The impregnated material was dried at 250° F. for 48 hours and a portion subsequently calcined for one hour at 1100° F. This material contained 5.6% V₂O₅.

162 g. of the above material dried at 250° F. were impregnated so as to saturate the pores with 90.7 cc. of a water solution containing 25.85 g. of $$Cu(NO_3)_2 \cdot 3H_2O$$

and .0267 g. of palladium chloride.

The above material was dried for 17 hours at 250° F. and subsequently calcined for one hour at 1100° F. The final catalyst contained 5% copper oxide, 0.01% of palladium, 5.3% of V₂O₅ and 1.8% SiO₂ on Al₂O₃.

A series of catalysts, A–F, identified hereinafter in Table IX and prepared generally in accordance with the procedure set forth in Examples 2–4 and 7, 8, and 10 were tested to determine their effect on the exhaust gases from a 6.3 horsepower Lauson internal combustion engine, referred to above as producing about 80% olefins of which about 63% of total olefins are olefins of three or more carbons. The results are set forth in Table VIII below.

The test unit employed in obtaining the test results illustrated in Table VIII was designed primarily to obtain information on effect of variables rather than to duplicate exactly a catalytic muffler. It consists of four 1 inch diameter tubes which fit closely inside holes in an aluminum bronze block. Catalyst (50 cc.) is charged to the central zone of these tubes. Exhaust from a Lauson 6.3 H.P. engine is joined by an air stream before passing through the catalytic bed in tests on exhaust gas. Gas samples are taken before and after the catalyst to determine effect of catalyst and analyzed by flame ionization for hydrocarbon content, by heat evaluation on passage through hopcalite for carbon monoxide and by thermal conductivity for hydrogen. When the unit is operated at about 320° C. inlet and block temperature, there is substantial (100–200° C.) temperature rise when over half the hydrogen and carbon monoxide is oxidized. Although this rise is less than would be realized in an adiabatic catalytic muffler, the results obtained are reasonably close. At 400° C. block temperature, temperature rise is less for a given conversion because of more efficient heat transfer from catalyst to tube and block.

Tests on pure hydrocarbons involve pure air mixed with small amounts of pure hydrocarbons. The amount of oxidation is such that the catalyst bed is substantially isothermal.

TABLE VIII.—COMPARISON OF EFFECTS OF CATALYST TYPES ON EXHAUST GAS [a]

|  | Inlet Temperature, °C. | Inlet,[c] Percent O₂ | A | B | C | D | E | F |
|---|---|---|---|---|---|---|---|---|
| Total Percent HC Removed Exclusive of Methane.[b] | 400 | 4 | 79 | 38 | ........ | 57 | 42 | 42 |
|  | 400 | 6 | 81 | 94 | ........ | 100 | 100 | 100 |
|  | 400 | 8 | 83 | 100 | ........ | 100 | 100 | 100 |
|  | 320 | 4 | 44 | 50 | 68 | ........ | ........ | ........ |
| Percent H₂ Oxidized | 400 | 3.5 | 8 | 96 | [d] 87 | 83 | 85 | 81 |
| Percent CO Oxidized | 400 | 3.5 | 5 | 73 | [d] 37 | 20 | 30 | 21 |

[a] On treatment of exhaust from Lauson 6.3 H.P. engine, referred to above. Composition: 6.9% CO, 3.6% H₂ 0.5% HC'S 20% CH₄, 30% C₂H₂, 30% C₂H₄, 20% C₃(+), N₂ and Argon.
[b] Methane considered harmless and therefore subtracted out from total values.
[c] Air added to exhaust gases before inlet to catalyst to provide oxygen level indicated.
[d] At 320° C.

The composition values of A–F inclusive of Table VIII are illustrated in Table IX.

TABLE IX

| Sample Number | Example Number | Components, percent ||||| 
|---|---|---|---|---|---|---|
|  |  | V₂O₅ | CuO | Pd | Pt | SiO₂ |
| A | 2 | 13 |  |  |  |  |
| B | 3 |  |  |  | 0.3 |  |
| C | 4 | 9 | 3 |  |  |  |
| D | 7 | 10 | 3 | 0.01 |  |  |
| E | 8 | 10 | 10 | 0.01 |  |  |
| F | 10 | 5.3 | 5 | 0.01 |  | 1.8 |

It is apparent from Table VIII that the platinum catalyst (B) is too active for carbon monoxide and hydrogen reduction to be very effective for hydrocarbon oxidation, unless very high oxygen levels are employed (6% and 8%), which requires high air induction rate and causes overheating of the catalyst in an adiabatic unit. The low activity of the V₂O₅-Al₂O₃ catalyst (A) at low temperature for hydrocarbons is also apparent as is its low activity for hydrogen and carbon monoxide. Although it will be observed that catalysts C, D, E, and F, typical catalysts of this invention, are less effective than catalyst A and as or more than B, in conversion of hydrocarbons at oxygen levels of about 4%, nevertheless, catalysts C, D, E, and F, are advantageous from the point of view of lower cost, faster warmup time and better stability, and are more attractive than Catalyst A and broadly better than B for the reduction of carbon monoxide, hydrogen and hydrocarbons.

In order to attest the effectiveness of catalysts A–F, identified hereinabove, on pure hydrocarbon exhaust gas feeds and in particular their effectiveness with respect to ethene (i.e., ethylene) and propene (i.e., propylene), comparative tests were made on these materials at temperatures of 400° C. and 320° C. respectively. The results of this comparison are shown in Table X hereinbelow.

TABLE X.—TESTS ON PURE HYDROCARBONS[a]

| Compound | Inlet Temperatures, °C. | Catalyst ||||||
|---|---|---|---|---|---|---|---|
|  |  | A | B | C | D | E | F |
|  |  | Percent HC Removed ||||||
| C₂H₄ | 400 | 62 | 99 | 96 | 99 | 99 | 99 |
| C₃H₆ | 320 | 79 | 96 | 94 | 100 | 100 | 100 |

[a] Multiple test unit, 110 min.—1% of 1% HC (mol percent C) in air.

Table X above establishes that catalyst of this invention (C, D, E, and F), are clearly more effective for olefin oxidation than catalyst A, the V₂O₅ catalyst (employed alone).

Since olefins and diolefins appear to be the more important smog precursors, catalyst A, B, and D, identified hereinabove and catalyst G (Example 5) were tested to determine their olefin oxidation activity. Results of this study appear in Table XI. Catalyst G contains about 10.4% $V_2O_5$, about 0.01% Pd, and about 1.8% $SiO_2$.

TABLE XI.—OLEFIN OXIDATION ACTIVITY

[° F. temperature for 50% conversion]

| | Catalyst | | | |
|---|---|---|---|---|
| | A Ex. 2 | B Ex. 3 | D Ex. 7 | G Ex. 5 |
| Ethene | 735 | 625 | 470 | 525 |
| Propene | 535 | 500 | 390 | 455 |
| Iso-butene | 535 | | 345 | 355 |

0.5 to 1.0% HC in air 110 min.⁻¹ space velocity.

It is readily observed from the results summarized in Table XI that catalyst D, a typical catalyst of this invention, is superior to catalysts A, B and G in effecting conversion of olefins at low temperatures. The lower temperature required for conversion, of course, indicates that much faster warmup times are possible thus maximum efficiency of the catalysts is reached more quickly.

A further advantage of the present invention is to be found in the fact that in use the catalyst of this invention produces a less obnoxious odor than that of a pure $V_2O_5Al_2O_3$.

Example 11.—(4633–107)

122 g. of base (3419–158) was pore saturated by 86.6 cc. of a solution containing 50.5 g. of copper nitrate trihydrate. The impregnated material was dried for 18 hours at 250° F. and calcined for 1 hour at 1100° F. The tested catalyst is illustrated in Table XIII. Catalysts of the same general type are illustrated in Table XIII as Example 17, in Table XIV as Example 28, and in Table XV as Example 32.

Example 12.—(4999–63)

235.4 g. of 5% silica stabilized 1/16″ extruded base (5134–15) was pore saturated with 198.3 cc. of a solution containing 0.709 g. Pt as $H_2PtCl_6$ and 5.26 g. $AlCl_3 6H_2O$. The material was dried at 250° F. for about 18 hours and calcined for 1 hour at 1100° F.

Example 13.—(NB 4999–67)

2.25 grams of hydrated aluminum chloride ($AlCl_3 \cdot 6H_2O$)

was added to 30.1 grams of palladium chloride solution containing 0.01 g. Pd/gram of solution. The volume of the solution was increased by addition of water, up to a total volume corresponding to 84.3 cc. of pore volume of 100 grams of 5%-silica stabilized alumina. The total solution was then titrated to the pore volume end point of the alumina, dried overnight at about 250° F. and calcined at about 1100° F. The alumina-base catalyst contained about 0.3% palladium and about 5% silica.

Example 14.—(NB 4999–65)

2.25 grams of hydrated aluminum chloride ($AlCl_3 \cdot 6H_2O$)

was added to a treating solution containing (1) 1.67 grams of palladium chloride solution containing 0.01 g. Pd/gram of palladium chloride solution, (2) 0.33 grams of platinum chloride solution containing 0.05 g. Pt/gram of platinum solution, and (3) 15.93 grams of hydrated cupric nitrate ($Cu(NO_3)_2 \cdot 3H_2O$) solution containing a total of 5.26 grams of copper oxide (CuO). The treating solution volume was increased by water addition, to a total volume corresponding to 84.3 cc. of pore volume of 5%-silica stabilized alumina. The total solution was then titrated to the pore volume end point of the alumina, dried overnight at about 250° F., and calcined at about 1100° F. The alumina-base catalyst contained about 0.017% Pd, about 0.017% Pt, 5% CuO, and 5% $SiO_2$.

Example 15.—(NB 4633–69)

A catalyst of the nature of that prepared in Example 13 was prepared, except that the final catalyst contained about 0.025% palladium.

Example 16.—(NB 4999–64)

2.25 grams of hydrated aluminum chloride ($AlCl_3 \cdot 6H_2O$)

was added to a treating solution containing (1) 5 grams of palladium chloride solution of 0.010.Pd/gram, and (2) 1 gram of platinum chloride ($PtCl_6$) solution containing 0.059 g. Pt/gram of platinum chloride solution, and the volume was increased (by water addition) up to a total volume corresponding to about 84.3 cc. of pore volume of 5% silica stabilized alumina. The total solution was then titrated to the pore volume end point of the alumina, dried overnight at about 250° F., and calcined at about 1100° F. The alumina-base catalyst contained about 0.05% Pd, 0.05 Pt, and 5% $SiO_2$.

Example 17.—(NB 4633–107)

A catalyst of the nature of that prepared in Example 11 was prepared, except that the final catalyst contained about 11% CuO.

Example 18.—(4999–54)

13.3 lb. of base, produced at a catalyst manufacturing plant facility, was slurried with water and 1.3 lb. $NH_4VO_3$. The slurry was heated to boiling. The base was separated from the mother liquor and dried at 250° F. for 18 hours. 14.9 lb. of recovered material was pore saturated with 5270 cc. of solution containing 2.38 lb. $Cu(NO_3)_2 \cdot 3H_2O$ and 67.9 g. of a 1% Pd as $PdCl_2$ solution. The catalyst was dried at 250° F. for 18 hours and calcined at 1200° F. for 1 hour.

Example 19.—(4633–190)

36.2 g. $NH_4VO_3$ and 400 grams of base (2% $SiO_2$=98% $Al_2O_3$ beads)

were placed in a container filled with water and heated to boiling (100° C.) for 30 minutes. The impregnated base was separated from the water and dried at 250° F. for 18 hours. A calcination at 1100° F. for 1 hour completed the preparation.

Example 20.—(5470–182–2)

Dissolve 33 g. of $NH_4VO_3$ and 52 g. $CuCO_3$ in ½ lb. of 12% $NH_3OH$ solution.

Prepare the extruder feed by mulling 1.72 lbs. of 5% silica-95% alumina slurry and 1.11 lbs. SDO2 2014 alumina. Add the ammoniacal solution containing the promoters to the muller along with 7 g. of polyacrylamide. Extrude the resultant mass (33% solids), oven dry, and calcine to finish the preparation.

This procedure is typical of that employed in preparing the catalyst illustrated in Table XIII.

Example 21.—(4633–55)

14.2 lbs. of 4374–19 base was pore saturated with 4332 cc. of a solution containing 3.23 g. of palladium as $PdCl_2$. The material was dried for 17 hours at 250° F.

Example 22.—(5470–121)

One hundred pounds of extrudates, produced at a catalyst manufacturing plant facility (5470–119, 5% silica stabilized), were slurried with 11.08 lbs. $NH_4VO_3$ and 200 lbs. water. After boiling for 3½ hours, the extrudates were drained of excess moisture and oven dried at 250° F. The dried extrudates were pore saturated with 36,000 cc. of a solution containing 5.16 lbs. of copper as $Cu(NO_3)_2$ and 48 g. of Pd as $PdCl_2$. The wet extrudates were rapid dried and calcined at 1100° F. for 1 hour.

Example 23.—(U25—Bureau of Mines)

High surface area alumina spheres (Alcoa H–151) is impregnated with a solution of uranyl nitrate, copper nitrate and chromium nitrate. Water is removed on a steam bath and the product is ignited in air at 700° C. in a muffle. A catalyst of this general type is illustrated in Table XIII.

Example 24.—(PH235.1)

A catalyst of the type prepared by the Bureau of Mines, containing about 2.5% CuO and about 5.8% $Cr_2O_3$ is illustrated in Table XIII.

Example 25.—(4473–132)

An alumina base catalyst containing about 15% $Fe_2O_3$ was prepared. A catalyst of this nature is illustrated in Table XIV.

Example 26.—(4633–145)

126.3 g. of alumina base was pore saturated with 92.2 cc. of 50.2% $Mn(NO_3)_2 \cdot 6H_2O$ solution. The impregnated material was dried for 18 hours at 250° F. and calcined for 1 hour at 1100° F.

Example 27.—(4473–131)

An alumina base catalyst containing about 10% $Cr_2O_3$ was prepared. A catalyst of this nature is illustrated in Table XIV.

Example 28.—(NB 4633–107)

A catalyst similar to that of Example 11 was prepared, except that the final catalyst contained about 10% CuO. A catalyst of this type is illustrated in Table XIV.

Example 29.—(NB 4633–73)

100 g. of base (5134–15) is pore saturated with 84.3 cc. of a solution containing 0.602 g. Pd as $PdCl_2$ and 2.25 g. $AlCl_3 \cdot 6H_2O$. The catalyst is dried for 18 hours at 250° F. and calcined at 1100° F. for 1 hour. A catalyst of this general type is illustrated in Table XIV, the Pd content being about 0.6%.

Example 30.—(4999–15)

Twenty pounds of 2% silica stabilized alumina extrudates (4894–55) were slurried with 30 lbs. of water and 4.0 lbs. $NH_4VO_3$. The boiling slurry impregnation method was used. The material was oven dried at 250° F. for 66 hours. 22 lbs. of dry extrudates were pore saturated with 4660 cc. of a solution containing 935 g. $Cu(NO_3)_2 \cdot 3H_2O$ and 0.996 g. palladium as $PdCl_2$. The material was dried and calcined in a normal manner.

Example 31

An extrudate catalyst having a fresh bulk density of 0.64 g./cc., containing about 5.3% $V_2O_5$, 6.4% CuO, 0.01% Pd, and 5% $SiO_2$ is illustrated in Table XV. This catalyst was prepared at a major catalyst production facility by the typical following procedures.

(1) Vanadium impregnation.—Three batches of sized calcined beads were impregnated 3 hours at 180° F., with recycle of spent solution. Batch makeup quantities are given below.

TABLE XII

| Batch No. | Heel, gal. | Heel plus Fresh Water, gal. | Lb. ammonium metavanadate UCC-Tech.* | Lb. Beads (as is) | Product, percent $V_2O_5$, DB (dry base) | | |
|---|---|---|---|---|---|---|---|
| | | | | | Drum 1 | Drum 2 | Drum 3 |
| 1 | Nil | 600 | 80 | 600 | 6.30 | 6.29 | 6.30 |
| 2 | 500 | 600 | 53 | 600 | 6.0 | 6.1 | 6.2 |
| 3 | 500 | 600 | 45 | 600 | 5.7 | 5.74 | 5.74 |

*Union Carbide Co.—Type—Technical-grade catalyst.

The resulting impregnated beads were drained of free water and transferred to a belt drier where the volatile content was reduced to about 9%.

(2) Copper-palladium impregnation.—This impregnation was carried out in a rotating drum impregnator. Five batches having 275 lb. of dried vanadized beads in each batch, were each impregnated with 210 lb. (21 gal.) of solution containing 57 lb. $Cu(NO_3)_3 \cdot 3H_2O$, 150 lb. water at 130° F., and 1200 cc. (2½ lb.) of solution containing 20.3 g. of 60% Pd palladium chloride and 30 cc. conc. HCl. The solution was sprayed via 16 nozzles in 15 minutes. All batches appeared uniformly wetted, not too sticky for good flow.

(3) Drying, calcination and final screening.—Wet beads were dried and calcined in an indirect fired kiln. The kiln was run with a product temperature range of 1150–1200, at about 200 lb./hr. feed (D.B.).

Example 32.—(4473–89 and 633–103)

A catalyst of the type having a fresh bulk density of 0.64 and containing about 11% CuO is illustrated in Table XV. The catalyst is of the general type prepared in Example 11.

Example 33.—(5139–101–1 through 6)

Seven hundred and fifty grams of beads (4994–76–1, 2, 3, and 4) at 5% $SiO_2$–95% $Al_2O_3$ was slurried with 77 grams of $NH_4VO_3$. The slurry was held at a boil for 5 hours. The beads were separated from the liquid and ovendried for 17 hours at 250° F. The beads were pore saturated with a solution containing $Cu(NO_3)_2$ and $PdCl_2$. The copper and palladia concentration were adjusted so that the final catalyst composition would be 5% CuO and 100 p.p.m. Pd. The wet beads were dried at 250° F. for 18 hours and calcined for 1 hour at 1100° F. The finished catalyst was screened into a size range of Tyler mesh, size 6–8.

Example 34.—(5134–101–4)

A catalyst was prepared by the procedure described in Example 33, except that this catalyst was of a Tyler mesh size 10 to 12.

Example 35.—(5134–101–2)

A catalyst was prepared by the procedure described in Example 33, except that this catalyst was of a Tyler mesh size of 14 to 16.

Examples 36–43.—(4894–153; 168–176; 183–191)

Examples 36 through 43 are illustrated in Table XVII. Except for the variations in the nature and percentage of stabilizer employed, each of the catalyst compositions were prepared by a procedure which is typically represented by the following procedure. In each example, the spray-dried material was admixed with water and extruded to yield a base which was subsequently impregnated with catalytic agents to obtain the final catalyst.

250 g. of extrudates are slurried in a basket with 25.6 g. $NH_4VO_3$. This basket is lowered into a beaker containing 600 cc. of water and boiled for about ¾ hour. The material is drained and ovendried at 250° F. overnight (18 hours). An aqueous solution containing 43.2 g. Cu(NO₃)₂·3H₂O in 149 cc. is sprayed onto a tumbling bed of impregnated (V₂O₅) extrudates. The extrudates are oven-dried for 22 hours at 250° F. and calcined at 1100° F. for 1 hour.

Example 44.—(5470-173)

A catalyst of the general type described in Example 31 is illustrated in Table XIX. This catalyst contained 5.3% V₂O₅, 6.4% CuO, 0.01% Pd, and 5% SiO₂.

Example 45.—(5470-195)

A catalyst of the general type described in Example 31 is illustrated in Table XIX. This catalyst contained 5% V₂O₅, 7% CuO, 0.01% Pd and 5% SiO₂.

Examples 46-48.—(5470-140-1 through 140-14) (typical of series i.e., 1-19)

The catalyst for Example 46 was prepared by the following procedure.

A solution containing copper, vanadium and palladium was prepared by dissolving 131.7 g. of CuCO₃ (Assay 55% Cu) and 78.3 g. of NH₄VO₃ in 750 cc. of 12% ammonium hydroxide. To the clear solution was added 11.2 cc. of a solution containing 1% Pd as PdCl₂. This solution was diluted to 1200 cc. total volume with water and sprayed on 3 lbs. of 5470-119 base (1/16 inch extrudates—5% SiO₂, 95% Al₂O₃). The pore saturated catalyst was dried at 250° F. for 18 hours and calcined at 1100° F. for 1 hour.

Examples 47 through 48 were prepared by a procedure identical to Example 46, except for variations in the percentages of the components of the catalytic composition.

Example 46, illustrated in Table XVIII is an average of tests of seven separate catalysts, each having 4% V₂O₅, 6% to 8% CuO, and 0.0075% to 0.0125% Pd.

Example 47, illustrated in Table XVIII is an average of tests of five separate catalysts, each having 5% V₂O₅, 7% CuO, and 0.01% Pd.

Example 48, illustrated in Table XVIII is an average of tests of eight separate catalysts, each having 6% V₂O₅, 6% to 8% CuO, and 0.0075% to 0.0125% Pd.

Test results illustrate Examples 11 through 48 in Tables XIII through XIX.

TABLE XIII.—COMPARISONS OF ACTIVITIES OF RANDOM CATALYTIC COMPOSITIONS TO THE CATALYST OF THE INVENTION

| Ex. No. (code) | Percent Components | | | | | | Base SiO₂ Percent | Bulk Den., g./cc. | Base SA, m.²/g. | Base PV, cc./g. | Base Cross-Sect., in. | Ign. Temp., °C. |
|---|---|---|---|---|---|---|---|---|---|---|---|---|
| | V₂O₅ | CuO | Pd | Pt | U₃O₈ | Cr₂O₃ | | | | | | |
| 11 (4633-107) | | 12 | | | | | | e 0.65 | 220 | 0.75 | 0.06 | 235-265 |
| 12 (4999-63) | | | | 0.03 | | | 5 | e 0.15 | 220 | 0.89 | 0.06 | 290 |
| 13 (4999-67) | | | 0.3 | | | | 5 | e 0.80 | 210 | | 0.06 | 185 |
| 14 (4999-65) | | 5 | 0.17 | 0.17 | | | 5 | e 0.53 | 210 | | 0.06 | 306 |
| 15 (4633-69) | | | 0.025 | | | | 2 | e 0.66 | 150 | 0.67 | 0.06 | |
| 16 (4999-64) | | | 0.05 | 0.05 | | | 5 | e 0.52 | 220 | 0.89 | 0.06 | 221 |
| 17 (4473-89 and 4633-107) | | 11 | | | | | | e 0.64 | 220 | 0.75 | 0.06 | |
| 18 (4999-54) | 7 | 5 | 0.01 | | | | 5 | e 0.58 | 210 | | 0.06 | 240-250 |
| 19 ª (4633-190) | 7 | | | | | | | e 0.64, 0.87 | | | 0.19 | |
| 20 ª (5470-182-2) | 5 | 7 | | | | | 5 | f 0.04 | | | 0.08 | |
| 21 ª ᵇ (4633-55) | | | 0.05 | | | | | e 0.77 | | | 0.07 | |
| 22 ª (5470-121) | 5 | 6 | 0.01 | | | | | e 0.81 | | | 0.07 | |
| 23 ª ᶜ | | 1.5 | | | 3.5 | 2 | | e 1.02 | | | 0.07 | |
| 24 ª | | 2.5 | | | 5.8 | | | e 1.03 | | | 0.07 | |
| 2 | 13 | | | | | | | | | | | |
| 4 | 9 | 3 | | | | | | | | | | |
| 7 | 3 | 3 | 0.01 | | | | | | | | | |
| 8 | 10 | 10 | 0.01 | | | | | | | | | |
| 10 | 5.3 | 5 | 0.01 | | | | | | | | | |

| Ex. No. (code) | Conversion at Space velocity of 220 min.⁻¹; 4% O₂; 1.5-2.5% CO; 0.5-0.8% HC; and a stoichiometric ratio of 2.0 | | | | Form Particles |
|---|---|---|---|---|---|
| | C₃H₆—°C. (Inlet) | THC—°C. (Inlet) | CO—°C. (Inlet) | C₄H₈—440°C. (2% O₂) | |
| 11 (4633-107) | 88%—340° ᵈ | 64%—410° ᵈ | 78%—410° ᵈ | | Extrudate. |
| 12 (4999-63) | | | | | Do. |
| 13 (4999-67) | | | | | Do. |
| 14 (4999-65) | | | | | Do. |
| 15 (4633-69) | | 62%—440° ᵈ | 97%—440° | | Beads. |
| 16 (4999-64) | | 68%—440° | 96%—440° | | Extrudate. |
| 17 (4473-89 and 4633-107) | | 72-89%—440° | 98-100%—440° | 70%—440° | Do. |
| 18 (4999-54) | 98%—325° ᵈ | 90%—440° | 100%—440° | | Do. |
| 19 ª (4633-190) | 38%—325° | 28%—440° | 15%—440° | 56%—440° | Beads. |
| 20 ª (5470-182-2) | | 90.5%—440° | 100%—440° | | Extrudate. |
| 21 ª ᵇ (4633-55) | | 46%—440° | 97%—440° | 68%—440° | Do. |
| 22 ª (5470-121) | | 83%—440° | 100%—440° | 91%—440° | Do. |
| 23 ª ᶜ | | 41%—440° | 40%—440° | | Beads. |
| 24 ª | | 40%—440° | 38%—440° | | Do. |
| 2 | 79%—400° | | | | |
| 4 | 94%—400° | | | | Extrudate. |
| 7 | 100%—400° | | | | Beads. |
| 8 | 100%—400° | | | | Do. |
| 10 | 100%—400° | | | | |

ª Samples leaded and tested in parallel by passing exhaust through small converters (50 cubic centimeters) until 40 gallons of gasoline with 2.5 milliliters of tetraethyl lead/gallon were used up (about 40 hours). Bed temperature during leading: 475° C. Lead levels about 15%, equivalent to about 10,000 miles road usage.
ᵇ Values are corrected, by multiplying observed values by 1.1, to adjust for higher CO level (2.2%).
ᶜ Catalysts obtained from Bureau of Mines, U.S. Department of Interior.
ᵈ At temperatures of about 325° C. or more variations in temperature up to about 30° C. are not significant for purposes of percentage of conversion data, whereby conversion data may be validly compared.
ᵉ Compacted Bulk Density.
ᶠ Apparent Bulk Density before leading.

As discussed above, the ability of a catalyst to convert olefins of three or more carbons is a factor of major importance in the control of smog conditions. Similarly, another major factor is the ability of an automobile exhaust catalyst to become effective for purposes of conversion at a low temperature, i.e., it is important for the catalyst to have a low ignition temperature. A comparison of Examples 11 through 18 bear on these factors. A comparison of the ignition temperatures of Examples 11, 12, 13, 14, and 18 discloses comparative ignition temperatures of 235–265° C., 290° C., 185° C., 306° C., 204–250° C., and 268° C., respectively. In a consideration of ignition temperature as a single factor, independent of the many other important factors associated with an automobile exhaust conversion catalyst, these examples illustrate that the ignition temperature of applicant's composition as illustrated in Example 18 is significantly lower than the ignition temperature for particular single catalysts employed alone, such as platinum, which has an ignition temperature of 290° C., and that applicant's composition has as good an ignition temperature (240–250° C.) as copper employed alone 235–265° C.). A comparison of the ignition temperatures further discloses that applicant's composition of Example 18 is superior to the random combination illustrated by Example 14, which employs copper, palladium, and platinum, and which has an ignition temperature of 306° C. The random catalyst combination illustrated by Example 14 substantiates that there is no apparent reason to expect a combination of several catalysts to obtain a low ignition temperature. This is particularly true in the light of the fact that the ignition temperature resuling from the combination of copper, palladium, and platinum, is 306° C. which is substantially higher than the ignition temperature of any one of the catalysts employed alone, such as copper—235–265° C., or platinum—290° C., or palladium—185° C.

Continuing the comparison, Example 15 illustrates that palladium employed alone as a catalyst obtained 97% carbon monoxide conversion but obtained merely a low 62% conversion of total hydrocarbons. When employing such a catalyst in an automobile exhaust converter, in order to obtain a satisfactory total hydrocarbon conversion, it would be necessary to also employ an air or oxygen concentration in such high amounts that the overheating problem would be encountered. Example 16, employing palladium and platinum, and illustrative of a random mixture of catalysts, encounters the identical problem, obtaining a high carbon monoxide conversion of 96 while obtaining a total hydrocarbon conversion which may reach a mere 68%. Examples 11 and 17, employing copper alone in percentages of 11% and 12%, when compared to the inventive composition of Example 18 employing 7% vanadia, 5% copper, and 0.01% palladium, as well as the comparison of the inventive composition illustrated in Example 18 as compared to the foregoing Examples 15 and 16, substantiates the superiority of the inventive composition in obtaining a high percentage conversion of total hydrocarbons, carbon monoxide, and $C_3H_6$—typical of olefins of three or more carbon atoms. The table demonstrates that the inventive composition of Example 18 obtains 98% conversion of $C_3H_6$ as contrasted to copper employed alone which obtains merely 88% conversion of $C_3H_6$. The 90% of total hydrocarbons of the inventive composition and the 100% carbon monoxide conversion of the inventive composition are in contrast to Examples 15, 16, and 17 which fail to obtain a high percentage of conversion of total hydrocarbons concurrent with obtaining a high percentage conversion of carbon monoxide.

Thus, from Examples 11 through 18, it is apparent that all compositions of random catalytic materials do not necessarily improve ignition temperature; for example, the ignition temperature of the random catalyst of Example 14 was significantly higher than the ignition temperature obtained by any one of the catalysts employed alone. It is also conclusively shown that compositions of random catalytic materials do not necessarily improve the percentage conversion; for instance, Example 16, which employed palladium and platinum in combination, failed to obtain a high percentage of conversion of total hydrocarbons and similarly, copper employed alone in Examples 11 and 17 failed to obtain a high percentage conversion of total hydrocarbons or of propylene ($C_3H_6$), in contrast to the inventive composition of Example 18, which obtained a high percentage conversion in all of these areas.

The foregoing examples also illustrate that a catalytic composition employing random mixtures, such as Example 16, may be satisfactory when considered for a single property, such as ignition temperatures, for use in an automobile exhaust converter, but is not satisfactory for obtaining the high conversion of both total hydrocarbons and carbon monoxide, for instance; Example 16 is illustrative of this point having a low ignition temperature of 221° C., but obtaining an unsatisfactory percentage conversion of total hydrocarbons, obtaining a mere 68% as contrasted to the inventive composition (Example 18) which obtains 90%.

In contrast to the other examples, Example 18, which illustrates an embodiment of applicant's invention discloses that the inventive composition obtains the desired low ignition temperature, a high degree of conversion of olefins having at least three carbon atoms, a high degree of conversion of total hydrocarbons, and a high degree of conversion of carbon monoxide.

Examples 19, 20, 21, 22, 23, and 24 illustrate the comparative resistance to leading desensitization of compositions (Examples 20 and 22) which are typical embodiments of applicant's invention, in contrast to single catalysts employed alone (Example 19 and Example 21), and catalysts representing random combination of catalytic materials (Example 23 and Example 24). A comparison of embodiments of the inventive composition of Examples 20 and 22 illustrates the superiority of the catalyst composition of this invention to random catalytic agents used alone or in combination, such as Example 21 employing palladium alone, Example 19 employing vanadia alone, and Examples 23 and 24 employing various combinations of copper oxide, urania, and chromium oxide. The compositions of this invention, i.e., Examples 20 and 22, demonstrate a high degree of resistance to lead poisoning, retaining 90.5% and 83% conversion activity for total hydrocarbons, respectively, and retaining 100% conversion activity for carbon monoxide for each respectively. The high degree of resistance to lead poisoning of the inventive embodiments illustrated in Examples 20 and 22 is in contrast to the poor resistance to lead poisoning demonstrated by Examples 21 (palladium alone), 23 (copper oxide, urania, and chromium oxide), and 24 (copper oxide and chromium oxide).

Examples 19 through 24 inclusive of the above Table XIII is evidence of the clearly superior properties, i.e., percent conversion of embodiments of the catalyst of this invention after leading, and that such superior characteristics could not have been predicted from a consideration of the properties of each of the components alone. Additionally, Examples 20 and 22 illustrate the exceptionally good resistance to leading of the catalysts of this invention as compared, for example, to a copper oxide-chromium oxide catalyst, as representative of a random combination composition.

Table XIII further illustrates Examples 2, 4, 7, 8, 10, and 11 demonstrating the superiority of various embodiments of applicant's composition (Examples 4, 7, 8, and 10), as contrasted to vanadia alone (Example 2) and copper alone (Example 11), in regard to the ability of an automobile exhaust gas catalyst to convert olefins having at least three carbon atoms, such as propylene ($C_3H_6$).

"Ignition temperature," as defined and discussed above, relates to the temperature at which an automobile exhaust catalyst first becomes substantially active as temperature increases. Because the ignition temperature of any specific catalyst is merely a single factor to be considered in determining the suitability of a catalyst composition for employment as automobile hydrocarbon gas exhaust catalyst, and because the relative activity and the loss of activity after a specific catalyst is subjected to the environment of automobile exhaust gases are other pertinent factors to be considered, a series of tests were conducted employing single catalytic materials (employed alone) and a corresponding test employing an embodiment of applicant's invention having vanadia, copper oxide, and palladium as the catalytic components (employed in combination). In this series of tests, in order to better carbon atoms. Additionally, it should be noted that the test for Example 30 (with 0.01 Pd) shows the conversion activity to be equivalent to, if not superior to the Example 29 employing 60 times as much (0.6) of the expensive palladium; it is significant at this point also to recall the supporting information above that because expensive metals such as platinum and palladium do not meet other requirements of a catalyst to be employed in an automobile exhaust gas converter, the test results as illustrated in Table XIV become even more significant.

Table XV (below) illustrates the effect of compositions of random catalysts as compared to an embodiment of the applicant's invention, as affecting the sensitivity of catalytic activity to leading.

TABLE XV.—CONVERSION CATALYST SENSITIVITY TO LEADING—AS AFFECTED BY COMPOSITION (440° C.; 4% $O_2$; 220 MIN.$^{-1}$.

| Example (Code) | Fresh Bulk Density | Composition, Percent | | | | | Percentage of Conversion | | | |
|---|---|---|---|---|---|---|---|---|---|---|
| | | $V_2O_5$ | CuO | Pd | $SiO_2$ | Form | THC Fresh | THC a Leaded | CO Fresh | CO Leaded |
| 12 (4999-63.) | 0.51 | | | 0.3 | 5 | Extr. | 95 | 64 | 100 | 100 |
| 31 (5470-173.) | 0.64 | 5.3 | 6.4 | 0.004 | 5 | Extr. | 93 | 77 | 100 | 98 |
| 32 (4473-89 and 63-103) | 0.64 | | 11 | | | | 92 | 71 | 100 | 98 | a Total hydrocarbons.

show the interrelationship of ignition temperature, catalytic activity, and resistance to lead poisoning and to steaming deactivation encountered through exposure to automobile exhaust gases, the tests illustrate a determination (for each of the tested catalysts) of temperature required for 50% conversion after each of the catalysts had already been briefly exposed to exhaust gas. Additionally, because the major offending components of exhaust in the cause of smog are the olefins, the tests were limited to ethylene, propylene, and isobutene as representative olefins. Particular importance is associated with the activity in regard to propylene and isobutene, since these are olefins having at least three carbon atoms, discussed above. The results of the series of tests are illustrated in Table XIV.

Table XV above illustrates for the catalyst composition of Examples 12, 31, and 32, their sensitivity to leading. The activity of palladium is reduced from 95% conversion to 64% conversion of total hydrocarbons. Activity of copper oxide is reduced from 92% conversion to 71% conversion of total hydrocarbons. In contrast, Example 31 catalytic composition which is an embodiment of this invention exhibits a substantially larger degree of resistance to leading; i.e., the catalyst composition of Example 31 retains a high degree of activity after leading for hydrocarbon conversion as well as carbon monoxide conversion activity.

In addition to the dependance of pressure drop on particle size, the smaller perforations in the catalyst exhaust converter support structure necessary to retain small cross TABLE XIV.—ACTIVITY OF ALUMINA SUPPORTED OXIDATION CATALYSTS, AFTER BRIEF EXPOSURE TO EXHAUST GAS, FOR PURE OLEFIN OXIDATION USING AIR

| Active Components | | | Ethene | Propene | Iso-butene |
|---|---|---|---|---|---|
| Example (Code) | Nature | Amount (Percent) | ° C. Temperature Required for 50%* Conversion | | |
| 2 (4633-1) | $V_2O_5$ | 13 | 391 | 279 | 229 |
| 25 (4473-132) | $Fe_2O_3$ | 15 | 396 | 274 | |
| 26 (4633-145) | $MnO_2$ | 15 | 329 | 271 | |
| 27 (4473-131) | $Cr_2O_3$ | 10 | 360 | 277 | |
| 28 | CuO | 10 | 316 | 260 | 179 |
| 12 | Pt | 0.3 | 329 | 260 | |
| 29 | Pd | 0.6 | 221 | 199 | 191 |
| 30 (4999-15) | $V_2O_5$ / Pd / CuO | 10 / 0.01 / 3 | 243 | 199 | 174 |

*0.5 to 1.0% hydrocarbon in air; space velocity: 110 min. $^{-1}$.

The test results as illustrated in Table XIV demonstrated that the catalyst compositions of this invention, of which Example 30 is typical, require lower temperatures for automobile exhaust gas olefin oxidation than those catalysts of Examples 2, 25, 26, 27, 28, 12, and 29, these latter catalysts being typical of random catalytic materials. The test results further illustrate the selective superiority of applicant's invention in the requirement of a low temperature for the conversion of olefins having at least three section catalyst are more vulnerable to plugging by lead deposits and scale-material normally generated in vehicle operation.

As can be seen in Table XV, smaller diameter catalyst particles are more susceptible to leading and tend to pick up a greater percentage of Pb than a large particle under identical leading conditions, in the environment of an over-all catalytic bed a result of impingment phenomenon discussed above.

TABLE XVI.—CONVERSION CATALYST SENSITIVITY TO LEADING—AS AFFECTED BY CROSS-SECTION: 440° C.; 4% O₂; 220 MIN.⁻¹; (V₂O₅, CuO, Pd, SiO₂).

| Example (Code) | Cross-Section, Inch | Bulk Density, g./cc. | | Lead* by Analysis | C₂H₄ Percentage Conversion and A. Time ᵃ | | C₃H₆ Percentage Conversion and A. Time ᵃ | | Percentage Conversion of THC ᵈ | | Percentage Conversion of CO | |
|---|---|---|---|---|---|---|---|---|---|---|---|---|
| | | Fresh | Leaded* | | Fresh | Leaded | Fresh | Leaded | Fresh | Leaded | Fresh | Leaded |
| 33ᵇ (5134-101-6) | 0.049 | ---------- | 0.96 | 12.5 | ---------- | 58% 54 Sec. | ---------- | 81% 54 Sec. | ---------- | 79 | ---------- | 93 |
| 34ᶜ (5134-101-4) | 0.070 | 0.85 | 0.92 | 9.7 | 72% 38 Sec. | 53% 85 Sec. | 96% 38 Sec. | 79% 85 Sec. | 88 | 69 | 100 | 82 |
| 35ᶜ (5134-101-2) | 0.113 | 0.79 | 0.83 | 7.3 | 51% 84 Sec. | 25% 275 Sec. | 82% 84 Sec. | 58% 275 Sec. | 77 | 53 | 90 | 54 |

*Standard Lead Test—32 hours duration—catalyst bed temperature at 450–500° C., fuel consumption about 345 lbs. of gasoline containing 2.5 ml· TEL/gal.
ᵃ Time required to reach the 256° C. ignition temperature, designated "activity time."
ᵇ Composition: 5.5% V₂O₅, 5.7% CuO, 0.01% Pd, 5% SiO₂, in the form of Beads.
ᶜ Composition: 5.7% V₂O₅, 4.9% CuO, 0.01% Pd, 5% SiO₂, in the form of Beads.
ᵈ Total hydrocarbons.

Table XVI above illustrates the catalytic compositions prepared in Examples 33, 34, and 35. Table XV illustrates the effect of cross section of the catalyst of this invention, on the degree of resistance to deactivation as a result of leading. The test results demonstrate for each catalyst composition the degree of conversion of ethylene (C₂H₄), propylene (C₃H₆), total hydrocarbons, and carbon monoxide. For the ethylene and the propylene conversions, an additional characteristic reflecting the activity of the particular catalytic composition is the time required to obtain the particular percentage of conversion at 440° C. The time required for each conversion, therefore, is included with the percentage conversion. As the activity decreases, the percentage conversion decreases and the time required for that conversion increases. Accordingly, from the test results illustrated in Table XV, (1) leaded activity for the conversion of ethylene, propylene and total hydrocarbons increases as the cross-section decreases, (2) although the "percentage loss" as a result of leading appears to be greater for the larger cross section, and (3) activity of catalysts of smaller cross section after leading is equivalent to or larger than the activity of catalysts of larger cross section when measured fresh (before leading); for example, the activity (as expressed in terms of percentage of conversion) of the catalytic composition of Example 34 after leading is 53% as compared to the fresh activity of the Example 35 composition. Table XVI further illustrates, however, that each of the embodiments of applicant's invention as illustrated by Examples 33, 34, and 35 have a high catalytic activity under both fresh and leaded conditions for the conversion of ethylene, propylene, total hydrocarbons and carbon monoxide. This phenomenon is in contrast to the loss in activity normally expected. It additionally becomes apparent from Table XIV that the optimum cross section as dictated by catalytic activity appears to be the minimum cross section which can practically be employed for use in an automobile exhaust gas converter.

Another type of stability necessary for a catalyst to be satisfactorily employed in an automobile exhaust converter, is a stability to steaming conditions encountered as a result of the high vapor content of automobile exhaust gas passing through an automobile exhaust gas converter catalyst bed. Steaming normally affects the surface area of a catalyst and accordingly, as the water vapor steaming conditions cause a reduction in surface area, the activity of the catalyst is normally substantially reduced. Similarly, as a result of steaming conditions, and surface area reduction, catalytic compositions normally exhibit a substantial loss in crush strength. Table XVII below illustrates the steaming of various catalytic compositions, some of which include embodiments of applicant's invention. Table XVIII below illustrates the effect of steaming upon various embodiments of the invention, as to surface area and as to crush strength as reflected in an increase in the number of fines.

TABLE XVIII.—RELATIVE CRUSH STRENGTH (PERCENT FINES PRODUCED) SENSITIVITY TO STEAMING AS AFFECTED BY PERCENTAGE OF V₂O₅ IN THE CATALYTIC COMPOSITION; STEAMING AT 850° C. FOR 17 HOURS (V₂O₅, CuO, Pd)

| Example | Percent V₂O₅ | Fresh ABD | Steamed | | |
|---|---|---|---|---|---|
| | | | Cross-Section (in.) | Crush-Strength, percent | |
| | | | | 400 lbs. | Attrition |
| 46 | 4 | 0.65 | ᵃ 0.055 | 10.2 | 38 |
| 47 | 5 | 0.68 | 0.054 | 14.2 | 50.2 |
| 48 | 6 | 0.66 | ᵇ 0.0535 | 18 | 62.8 |
| Control ᶜ | 0 | ---------- | ---------- | 4.6 | 11.3 |

ᵃ Average of six catalysts.
ᵇ Average of four catalysts.
ᶜ Calcined and steamed alumina base.

Table XVIII above illustrates the relative crush strength sensitivity to steaming as affected by the percentage of vanadia content in the catalytic composition containing vanadia, copper oxide, and palladium. This table relates to the Examples 46 through 48 discussed above.

The table illustrates that as the vanadia percentage increases, there is a substantial increase in the sensitivity of the catalytic composition of this invention to steaming conditions, whereby steaming causes a substantial reduction in crush strength of the catalyst, as reflected in the increase in the percentage fines from Examples 46 through 48, of 10.2% to 14.2%, to 18% respectively, and a reduction in attrition resistance as reflected in increased percentage fines resulting from attrition of Example 46 having 38% fines to Example 47 having 50.2% fines, to Example 48 having 62.8% fines. Each of the above catalysts have a relative crush strength resistance to a noncatalytic alumina base which had been subjected to calcining and steaming conditions. Thus, it is apparent that the preferred catalytic composition of this invention contains from about 4% to about 7% of vanadia, from the standpoint of resistance, in relation to crush strength sensitivity to steaming conditions.

Table XIX below illustrates the effect of pore volume of automobile exhaust gas converter catalysts of this invention.

TABLE XIX.—EFFECT OF PORE VOLUME ON LEAD TOLERANCE AND ON CRUSH STRENGTH

| Example (Code) | Composition, Percent | | | | PV Fresh (cc./g.) | Cross-section (in.) | Catalyst Activity (Percent Conversion) | | | | | | Crush Strength, Percent Fines resulting from— | |
|---|---|---|---|---|---|---|---|---|---|---|---|---|---|---|
| | V₂O₅ | CuO | Pd | SiO₂ | | | THC | | | CO | | | 400 Lbs.ᵃ | Jet Attrition |
| | | | | | | | Fresh | Leaded | Percent Loss | Fresh | Leaded | Percent Loss | | |
| 44 (5470-173) | 5.3 | 6.4 | 0.01 | 5 | 0.74 | 0.054 | 87 | 78 | 10 | 100 | 96 | 4 | 18 | 44 |
| 45 (5470-195) | 5 | 7 | 0.01 | 5 | 0.60 | 0.057 | 88 | 69 | 21.6 | 100 | 96 | 4 | 10 | 19 |

ᵃ Bulk Crush Test.

Table XIX illustrating Examples 44 and 45, demonstrates the effect of pore volume on lead tolerance and on crush strength for two separate embodiments of applicant's invention. The two Examples 44 and 45 are substantially similar except for the difference in pore volume. The table discloses that the loss of catalytic activity for the conversion of hydrocarbons upon being leaded was a loss of 10% for a pore volume of 0.75, and a loss of about 22% for a pore volume of 0.60. Thus, it is seen that the sensitivity of the catalytic composition to leading substantially increases as pore volume decreases. Table XIX additionally discloses, however, that as the pore volume decreases from 0.74 to 0.60, the crush strength, as reflected by the number of fines produced by 400 pounds pressure and by jet attrition, approximately doubled, i.e., the number of fines produced in Example 45 catalyst were approximately ½ of those produced by Example 44 catalyst.

Other suitable changes and variations may be made in carrying out the invention as described herein without departing from the spirit and scope thereof, as defined in the appended claims.

I claim:
1. A process for oxidizing exhaust gases from hydrocarbon fuels comprising contacting said gases with an exhaust gas converter catalyst in the presence of at least about 2% to about 6% oxygen, said catalyst comprising a major portion of alumina, between from about 2% to about 10% of vanadia, and between from about 2% to about 10% of copper, said percentages being by weight.

2. A process for oxidizing exhaust gases from hydrocarbon fuels according to claim 1, in which said vanadia ranges between from about 4% to about 7%, in which said copper ranges between from about 3% to about 7% in the form of copper oxide, and said catalyst additionally comprising between from about 0.01% to about 0.015% of palladium, and silica in an amount sufficient to stabilize.

3. A process according to claim 2, in which said catalyst has a cross section of between from about 0.05 inch to about 0.20 inch and has a pore volume of between from about 0.7 cc./g. to about 0.9 cc./g.

4. A process for oxidizing exhaust gases from hydrocarbon fuels according to claim 1, said process additionally comprising providing said oxygen by flowing air at a rate of from between about 0.5 to about 3.0 cubic feet of air per minute.

5. A process for oxidizing exhaust gases from hydrocarbon fuels according to claim 1, said process additionally comprising flowing said oxygen at a rate sufficiently high to substantially oxidize said exhaust gases, at a rate sufficiently low to substantially prevent overheating of an exhaust gas converter, and at a rate sufficiently low to substantially prevent cooling of said catalyst below the ignition temperature of said catalyst.

6. An automobile exhaust gas converter including a bed of particles impregnated with oxidation catalytic material comprising between from about 4% to about 7% of vanadia, between from about 3% to about 7% of copper in the form of copper oxide, and between from about 0.01 to about 0.015% of palladium, said percentages being by weight, said particles having a cross section between from about 0.05 inch to about 0.20 inch, and a pore volume between from about 0.7 cc./g. to about 0.9 cc./g.

7. In an automobile exhaust gas converter according to claim 6, an oxidation catalyst-bed in which said particles include silica in an amount sufficient to stabilize said catalyst.

References Cited
UNITED STATES PATENTS

| 2,942,933 | 6/1960 | Batchelder et al. | 23—2 |
| 3,045,422 | 7/1962 | Houdry | 23—2 |
| 3,224,981 | 12/1965 | Stephens et al. | 23—2 X |

OSCAR R. VERTIZ, *Primary Examiner.*

A. GRIEF, *Assistant Examiner.*

U.S. Cl. X.R.
23—288

UNITED STATES PATENT OFFICE
CERTIFICATE OF CORRECTION

Patent No. 3,438,721         Dated April 15, 1969

Inventor(s)  William Beveridge Innes

It is certified that error appears in the above-identified patent and that said Letters Patent are hereby corrected as shown below:

Col. 32, line 21, for "XVIII", read -- XVII --;

Col. 32, line 26, for "Table XVIII", read -- Table XVII --;

Col. 32, line 41, for "XVIII", read -- XVII --;

Col. 32, line 64, for "XIX", read -- XVIII --;

Col. 32, line 67, for "Table XIX", read -- Table XVIII --;

Col. 33, line 1, for "XIX", read -- XVIII --;

Col. 33, line 12, for "XIX", read -- XVIII --.

Signed and sealed this 15th day of February 1972.

(SEAL)
Attest:

EDWARD M. FLETCHER, JR.          ROBERT GOTTSCHALK
Attesting Officer                Commissioner of Patents